(12) United States Patent
Payne et al.

(10) Patent No.: US 6,212,047 B1
(45) Date of Patent: *Apr. 3, 2001

(54) HARD DISK DRIVE WITH MAGNETORESISTIVE HEAD AND PERPENDICULAR MEDIA

(75) Inventors: Alexander P. Payne, Ben Lomond; William C. Cain; Michael E. Devillier, both of San Jose; Harold J. Hamilton, Santa Clara; Robert D. Hempstead; Darren T. Imai, both of Los Gatos; Dimitre A. Latev, San Jose; Mark A. Lauer, Pleasanton; David D. Roberts, Santa Cruz, all of CA (US)

(73) Assignee: Censtor Corporation, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/771,468

(22) Filed: Dec. 20, 1996

Related U.S. Application Data

(60) Division of application No. 08/577,493, filed on Dec. 22, 1995, which is a continuation-in-part of application No. 08/528,890, filed on Sep. 15, 1995, which is a continuation-in-part of application No. 08/338,394, filed on Nov. 14, 1994, which is a continuation-in-part of application No. 07/966,095, filed on Oct. 27, 1992, now Pat. No. 5,550,691, which is a continuation-in-part of application No. 07/783,509, filed on Oct. 28, 1991, now abandoned, which is a continuation-in-part of application No. 07/632,958, filed on Dec. 21, 1990, now Pat. No. 5,073,242, which is a continuation-in-part of application No. 07/441,716, filed on Nov. 27, 1989, now Pat. No. 5,041,932.

(51) Int. Cl.$^7$ .................. G11B 5/39; G11B 5/48
(52) U.S. Cl. ................. 360/318.1; 360/246.1; 360/237.1
(58) Field of Search ............... 360/113, 125, 360/126, 122, 104, 97.01, 97.02, 234.7, 234.8, 234.9, 237.1, 318.1, 246.1, 246.2, 246.5

(56) References Cited

U.S. PATENT DOCUMENTS

| | | | | |
|---|---|---|---|---|
| 3,397,289 | * | 8/1968 | Pfost et al. | 360/246.1 |
| 4,423,450 | * | 12/1983 | Hamilton | 360/111 |
| 4,587,176 | * | 5/1986 | Carcia | 360/135 X |
| 4,803,577 | * | 2/1989 | Ezaki et al. | 360/246.1 |
| 4,819,091 | * | 4/1989 | Brezoczky et al. | 360/97.01 |
| 4,949,207 | * | 8/1990 | Lazzari | 360/126 X |
| 5,041,932 | * | 8/1991 | Hamilton | 360/104 |
| 5,408,373 | * | 4/1995 | Bajorek et al. | 360/126 X |
| 5,557,488 | * | 9/1996 | Hamilton et al. | 360/237.1 |

OTHER PUBLICATIONS

Daniel Chapman, "A New Approach To Making Thin Film Head–Slider Devices", IEEE Transactions On Magnetics, vol. 25, No. 5, pp. 3686–3688, Sep. 1989.*

* cited by examiner

Primary Examiner—David L. Ometz
(74) Attorney, Agent, or Firm—Mark Lauer

(57) ABSTRACT

An information storage system having a ring head in such close proximity to a rigid magnetic storage disk that the magnetic field felt by the media layer or layers of the disk has a larger perpendicular than longitudinal component so that data is stored in a perpendicular mode. Reading of data is accomplished with a magnetoresistive sensor which may be coupled to the magnetically permeable core of the ring head far from the poletips, which may contact the disk. The media preferably has a high perpendicular anisotropy, and may be formed in a plurality of films with crystalline structures traversing the films.

21 Claims, 10 Drawing Sheets

HARD DISK DRIVE WITH MAGNETORESISTIVE HEAD AND PERPENDICULAR MEDIA

CROSS-REFERENCE TO RELATED APPLICATIONS

This application is a divisional of pending U.S. patent application Ser. No. 08/577,493, filed Dec. 22, 1995 which is a continuation-in-part of pending U.S. patent application Ser. No. 08/528,890, filed Sep. 15, 1995, which is a continuation-in-part of pending U.S. patent application Ser. No. 08/338,394, filed Nov. 14, 1994, which is a continuation-in-part of issued U.S. Pat. No. 5,550,691, filed Oct. 27, 1992 as U.S. patent application Ser. No. 07/966,095, which is a continuation-in-part of abandoned U.S. patent application Ser. No. 07/783,509, filed Oct. 28, 1991, which is a continuation-in-part of U.S. patent application Ser. No. 07/632,958, filed Dec. 21, 1990, now U.S. Pat. No. 5,073,242, which is a continuation-in-part of U.S. patent application Ser. No. 07/441,716, filed Nov. 27, 1989, now U.S. Pat. No. 5,041,932.

TECHNICAL FIELD

The present invention relates to disk drive systems for magnetic storage and retrieval of information.

BACKGROUND OF THE INVENTION

Hard disk drives have traditionally employed electromagnetic transducers that are spaced from a rapidly spinning rigid disk by a thin layer of air that moves with the disk surface. Such a spacing is believed to be important in avoiding damage between the rapidly spinning disk and the transducer, which is constructed with an aerodynamic "slider" designed to "fly" slightly above the disk surface, buoyed by the moving air layer. This spacing or fly height, however, limits the density with which data can be stored and lowers the resolution and amplitude with which data can be retrieved.

Data is conventionally stored in a thin media layer adjacent to the disk surface in a longitudinal mode, i.e., with the magnetic field of bits of stored information oriented generally along the direction of a circular data track, either in the same or opposite direction as that with which the disk moves relative to the transducer. In order to record such a longitudinal bit in the media layer, the transducer has a ring-shaped core of magnetic material with a gap positioned adjacent to the disk, while current in a coil inductively coupled to the core induces a magnetic field adjacent to the gap strong enough to magnetize a local portion of the media, creating the bit. This type of transducer is commonly termed a "ring head." The media layer for this form of data storage has an easy axis of magnetization parallel to the disk surface, so that writing of bits in the longitudinal mode is energetically favored. Since adjacent bits within the plane of the thin film media have opposite magnetic directions, demagnetizing fields from adjacent bits limit the minimum length of a magnetic transition between such bits, thereby limiting the density with which data can be stored and lowering the signal-to-noise ratio at high bit densities. Moreover, at high bit densities, the transition location between longitudinal bits is more difficuly to control, increasing errors known as "bit shift". Also, overlap between adjacent longitudinal bits of opposite polarity can result in reduced transition amplitude at higher bit densities, termed "partial erasure" and reducing the signal to noise ratio since a larger fraction of each bit is degraded by the transition. At very high densities, demagnetization of the oppositely directed longitudinal bits may occur over time, resulting in data loss.

Perpendicular data storage, in which the magnetic data bits are oriented normally to the plane of the thin film of media, has been recognized for many years to have advantages including the relative absence of in-plane demagnetizing fields which are present in longitudinal data storage. In addition to potentially achieving sharper magnetic transitions due to the reduction of bit shift and partial erasure, perpendicular data storage may offer a more stable high density storage, at least for multilayered media. Despite these advantages, perpendicular data storage has not yet seen commercial success. The system typically proposed for perpendicular recording includes a transducer having a single pole, commonly termed a "probe head." In order to form a magnetic circuit with the probe head, a magnetically soft underlayer adjoins the media layer opposite to the pole, the underlayer providing a path for magnetic flux that flows to or from the transducer through a return plane of the head separate from the pole.

Several disadvantages of the probe head and underlayer system have been discovered. Comparison of a probe head with a ring head having a gap of a thickness equal to that of the single pole has revealed that the longitudinal fields from the ring head are more spatially localized than the perpendicular fields from the probe head, since the field lines in a ring head span from the closest edges of one pole to the other across the gap, while the field lines in the single pole probe head radiate from both the probe tip and the sides of the probe toward the underlayer (unless the poletip contacts the underlayer), the field lines from the sides of the probe essentially broadening the transition beyond the dimensions of the probe tip. Moreover, the ring head has a single amagnetic gap, while the probe head has two gaps: one between the probe and underlayer and one between the return plane and the underlayer. The presence of this second gap renders the probe head extremely sensitive to external stray fields. Due to the high reluctance of the second gap, stray fields entering the head are channeled directly through the probe and across the media. Calculations show that a 5 Gauss (G) stray field can easily be amplified to 2000 G at the center of the media, large enough to cause erasure, which we have observed in the laboratory.

One of the advantages of the probe head and underlayer recording system is that the write fields produced between the probe and underlayer are generally stronger than those attained underneath the gap of a ring head. There is a disadvantage to the high write fields, however, in heads of insufficient stability, since domains oriented parallel to the probe can induce fields at the media gap which are strong enough to erase data, another effect which we have observed empirically. Moreover, achieving an efficient magnetic circuit in the probe head and underlayer system is difficult. During head fabrication, great care is taken to magnetically align the easy axis of the permalloy yoke perpendicular to the direction of magnetic flux flow. While this may be relatively straightforward to accomplish in the small magnetic structures of the head, it is problematic for large circular structures such as the soft magnetic underlayer of the disk, which forms part of the magnetic flux circuit in the probe head system. As a result, the permeability of the underlayer has generally been unsatisfactory and inhomogeneous, and the magnetic circuit therefore inefficient.

The possibility of employing a flying ring head in combination with media having a perpendicular anisotropy appears to have been originally proposed in an article entitled, "Self-Consistent Computer Calculations For Perpendicular Recording," IEEE Transactions On Magnetics, September 1980, by Potter and Beardsley. A difficulty in the system described in this article is that the maximum perpendicular component of the magnetic field transmitted from the head to the medium is substantially less than the maximum longitudinal component of that field. Wang and Huang, in "Gap-Null Free Spectral Response of Asymmetric Ring Heads For Longitudinal and Perpendicular Recording", IEEE Transactions On Magnetics, September 1990, calculate the magnetic fields transmitted from a ring head that has a gap angled away from normal to a media layer. Similarly, Yang and Chang, in an article entitled "Magnetic Field of an Asymmetric Ring Head with an Underlayer", IEEE Transactions On Magnetics, March 1993, calculate the magnetic fields transmitted from a ring head with a slanted gap, and include a soft magnetic underlayer adjacent to the media to complete the magnetic circuit of the ring head.

Osaka et al., in the article "Perpendicular Magnetic Recording Process Of Electroless-Plated CoNiReP/NiFeP Double Layered Media With Ring-Type Heads", look at recording performance of flexible double layered magnetic media to measure the effect of various coercivity underlayers. And Onodera et al., in the article "Magnetic Properties And Recording Characteristics of CoPtB-O Perpendicular Recording Media" investigate how varying the proportion of oxygen can be used to control the perpendicular anisotropy and coercivity of that media, which is measured with a metal-in-gap video cassette recorder ring head. More recently, U.S. Pat. No. 5,455,730 to Dovek et al. proposes a disk drive system with a slider that skis on a liquid spread atop a wavy disk, with a transducer stepped back from the support surface having a magnetoresistive sensor and an electrical means for compensating for a baseline modulation induced by the temperature sensitive waviness of the disk. Unfortunately, the spacing added by the liquid and the distance between the bottom of the carrier and the transducer reduces data storage density and resolution.

An object of the present invention was to provide a system that affords the advantages of perpendicular data storage in a durable, high density, hard disk drive system.

SUMMARY OF THE INVENTION

The above object has been achieved in a hard disk drive system employing a microscopic transducer having a loop of magnetic material with ends separated by an amagnetic gap located adjacent to the disk, the transducer continuously sliding on the disk so that the separation between the ends and the media layer of the disk is maintained at a small fraction of the gap separation. Due to the small head to media separation provided by contact operation, the magnetic field generated by the transducer and felt by the media has a larger perpendicular than longitudinal component, favoring perpendicular recording over longitudinal recording. Moreover, the head to media separation is small enough to allow a significant reduction in the gap size without causing the longitudinal field component to predominate over the perpendicular field component, providing further increases in data density. The media preferably has an easy axis of magnetization in the perpendicular direction, so that perpendicular data storage is energetically favored.

In order to provide enduring contact operation between the transducer and the disk, the transducer is preferably shaped like a low-profile table with three short support legs that slide on the disk surface during information transfer between the transducer and the media. This embodiment of the transducer includes a magnetic core which stretches like a shallow, symmetric loop within the plane of the table, with ends of the loop extending into one of the legs to form a pair of closely spaced magnetic poletips exposed to the disk surface in close proximity to the medium. Inductively coupled to the core is a conductive coil that spirals in opposite directions around laterally opposed sections of the core. In an embodiment employing coils for reading as well as writing, the spirals are stacked like pancakes centered on the opposed core sections. The core and the coil extend substantially further in the plane of the table top than along the direction with which the legs project, affording the mechanically and aerodynamically favorable low profile shape. The table top may be T-shaped or trapezoidal, reducing the mass of the transducer and increasing the number of transducers that can be obtained per wafer while retaining three-legged stability.

During writing of information to the medium, a current in the coil creates a magnetic field along the length of the loop shaped core, creating a magnetic field that, in part, circles around the gap and passes through the adjacent media layer, inducing a perpendicularly oriented magnetic field in that layer. Since the poletips are in contact with the disk surface and have an extremely small gap, very high resolution writing of information can be accomplished with this system. Unlike conventional heads which have tight tolerances for vertical throat height, the dimensions of the planar core of the present invention allow the throat height to vary substantially without impeding writing and reading efficiency, affording tolerance for wear of the sliding poletips. Additionally, the trailing poletip may be coated with a high magnetic saturation material adjacent to the gap in order to provide an intense magnetic field adjacent to that high B, material without saturation, even at field strengths exceeding 10,000 Gauss. This allows the writing field of the trailing poletip to more easily overcome the magnetization left by the oppositely directed field of the leading poletip, also ensuring excellent overwriting of data.

Reading of magnetic patterns imbued in the medium may be accomplished by utilizing the changing magnetic field seen by the poletips from the spinning disk on which the tips slide, creating a voltage in the inductively coupled coil that is read as a signal. Due to the intimate contact between the poletips and the recording surface, very high signal resolution and amplitude is achieved. In order to increase the high frequency permeance of the head, the core may be formed of elongated strips, layers or filaments. In a preferred embodiment, the core is shaped like a clamshell, allowing formation of several coil layers within the core without unnecessarily increasing the reluctance of the core. Alternatively, reading of the perpendicularly oriented bits arrayed on the medium may be accomplished with a magneto-resistive (MR) sensor that determines whether a specific bit has been magnetized in an up or down direction. This sensor need not be positioned in intimate contact with the disk surface in order to obtain a resolution adequate for reading the high density of stored data, and therefore avoids problems due to changes in resistance caused by temperature rather than magnetic fluctuations. In a preferred embodiment, the MR element piggybacks the magnetic core and thus takes advantage of the permeability of that core and the position of the poletips in contact with the disk. This embodiment employs only a single coil layer and a core formed atop the coil that approaches the poletips in shallow, symmetric steps.

The low-profile, three-legged transducer is attached via a gimbal to a load beam to present a dynamic configuration that closely and rapidly conforms to a spinning disk so as to maintain contact and high resolution communication with the medium. The load beam is oriented substantially along the direction with which the transducer slides on the disk, providing alignment between the direction of the beam most resistant to outside forces and the force of friction felt by the head and gimbal assembly. Due to the small legs, which act like short stilts lifting the rest of the transducer above the thin moving air layer that adjoins the disk, little of the transducer is impinged upon by that thin moving air layer, and so minimal lifting force is generated that must be overcome to maintain contact. Additionally, the planar core allows the head to assume a relatively flat, stable, low-profile conformation with lower moment arms about the head-disk contact area, including both a lower moment of inertia of the chip and a lower effective mounting point of the beam holding the chip. The transducer is built in layers, along with many other transducers, on the surface of a wafer substrate from which the transducers are later removed, allowing the transducer to be much smaller and lighter in weight than conventional transducers that include bulk substrate materials. The active portion of the transducer occupies a much greater fraction than conventional sliders, increasing the tendency to remain in operational contact, thereby providing high perpendicular write and read fields. The legs, including the magnetically active leg containing the projecting poletips, are formed last, allowing careful tailoring of some of the most sensitive portions of the transducer. The optional MR sensor, on the other hand, is formed in one of the first steps, ensuring a planar, contaminant free surface for formation of the MR stripe.

DESCRIPTION OF THE PREFERRED EMBODIMENT

Figure 1:
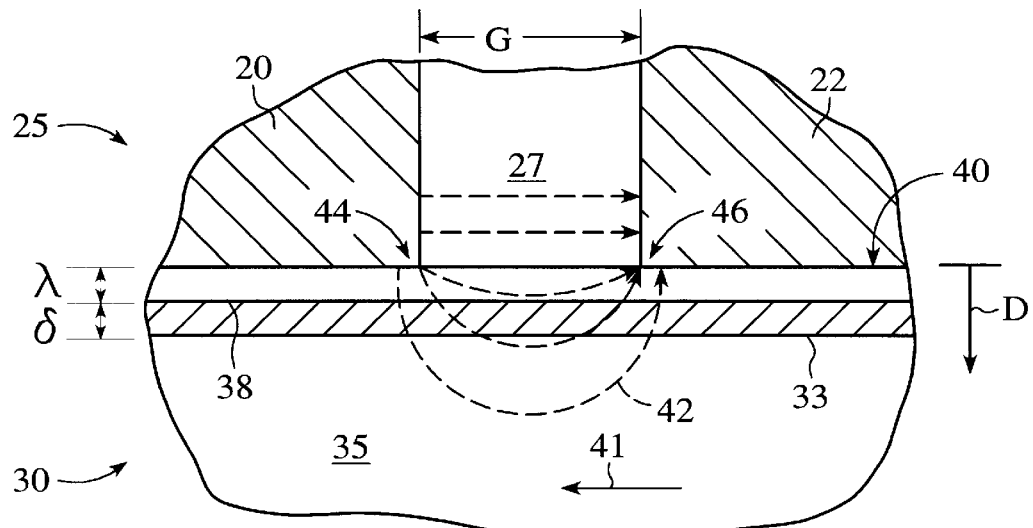
FIG. 1 shows a greatly enlarged, simplified, cross-sectional view of a portion of a data storage system of the present invention.

Referring now to FIG. 1, a greatly enlarged cross-sectional view of an information storage system of the present invention focuses on a pair of poletips 20 and 22 of an electromagnetic transducer 25 that are separated by an amagnetic gap 27, the transducer sliding on a rigid magnetic recording disk 30. The disk 30 in this simplified drawing has a media layer 33 disposed between a substrate 35 and a protective overcoat 38, and a surface 40 on which the transducer 25 slides, the disk moving relative to the transducer in a direction shown by arrow 41. As a descriptive aid, a direction normal to disk surface 40 is termed the perpendicular or vertical direction, while a direction parallel to the disk surface 40 is defined in terms of lateral and longitudinal directions. The gap 27 has a longitudinal extent G separating the poletips 20 and 22 that is several times a perpendicular distance D separating the poletips from the media layer 33, distance D including the thickness $\lambda$ of the overcoat 38 and any lubricant, not shown, disposed atop the overcoat. The media layer 33 has a thickness $\delta$ such that the perpendicular distance D from a midpoint of the media layer 33 and the poletips 20 and 22 is a fraction of the gap extent G. A number of magnetic fields lines 42 produced by the transducer 25 during writing of data on the disk 30 travel both directly across the gap 27 and radiate in a semicircular fashion from one poletip 20 to the other 22 through the media layer 33. The field lines 42 that penetrate the disk 30 are most concentrated adjacent to corners 44 and 46 of respective poletips 20 and 22.

Figure 2:
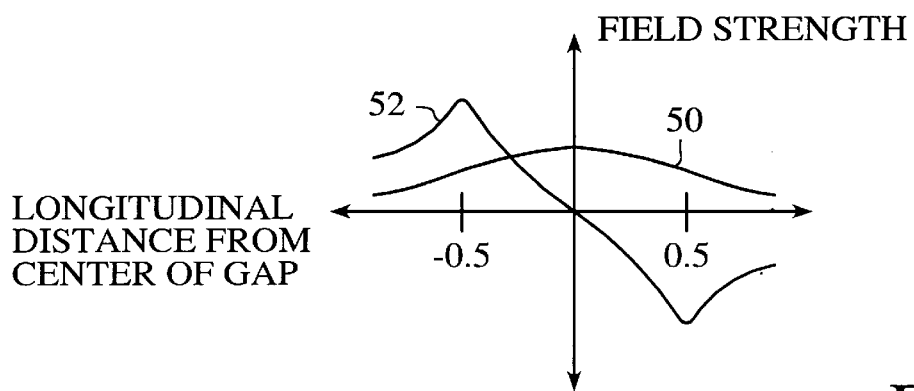
FIG. 2 shows a plot of longitudinal and perpendicular field components of the magnetic field transmitted from the poletips to the medium of the data storage system of claim 1.

In FIG. 2, the field lines 42 of FIG. 1 are displayed in terms of the magnitude of longitudinal 50 and perpendicular 52 components felt by the media layer 33 at a perpendicular distance D from the poletips 20 and 22 that is in the neighborhood of one-tenth the gap spacing G. The dimensions along the horizontal axis of this figure are depicted with the gap spacing G being equal to unity. The longitudinal component 50 can be seen to have the shape of a symmetrical curve that peaks in the media layer 33 directly across from a center of the gap 27. The perpendicular component 52, on the other hand, has zero strength directly opposite from the center of the gap 27, and a peak in magnitude directly opposite both of the comers 44 and 46, the peak opposite corner 46 having a negative value to reflect that the perpendicular component opposite comer 46 is oppositely directed relative to the perpendicular component opposite comer 44. Note that the perpendicular component 52 of the magnetic field felt by the media has a magnitude nearest the comers 40 and 44 that exceeds the maximum magnitude of the longitudinal component 50, encouraging perpendicular data storage in the media layer.

Figure 3:
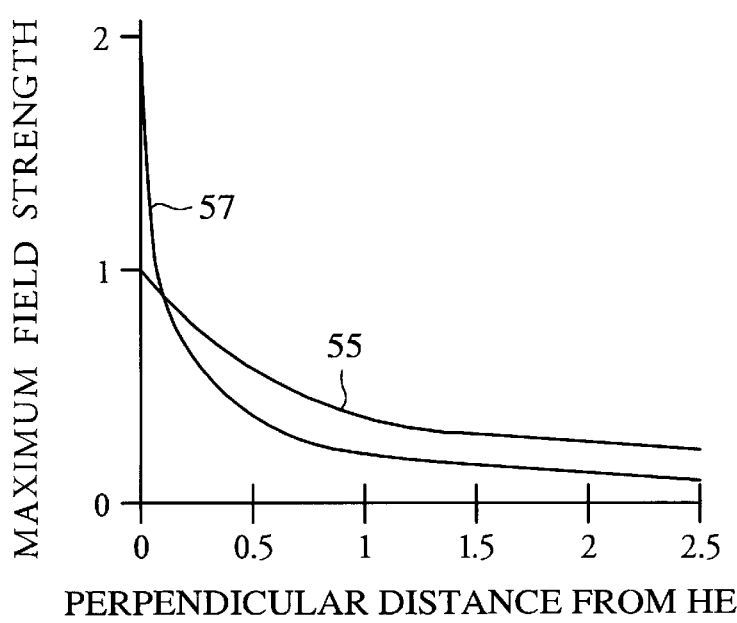
FIG. 3 shows a plot comparing maximum strength perpendicular and longitudinal magnetic field components transmitted from the poletips of FIG. 1 at various distances from the head.

FIG. 3 compares a maximum longitudinal field component 55 with a maximum perpendicularly oriented field component 57 over various perpendicular distances D from the poletips 20 and 22. As can be seen in the previous figure, the maximum longitudinal component is found directly opposite the center of the gap whereas the maximum perpendicular component occurs directly opposite comers 44 and 46. In FIG. 3 the longitudinal field strength deep within the gap 27 has been given a unitary value for reference, and the vertical distance D from the poletips 20 and 22 is given in units for which a distance D equal to the gap width G is equal to one. It is apparent that the maximum perpendicularly oriented fields 57 vary with distance D from the poletips 20 and 22 much more dramatically than the maximum longitudinally oriented fields 55 for distances D less than about one-quarter of the gap spacing G, such that the perpendicular fields are stronger than the longitudinal fields at vertical distances from the poletips that are a small fraction of the gap width G, while the longitudinal fields are stronger than the perpendicular fields at distances D further than a fraction of the gap width.

A gap-to-media spacing ratio of ten, which is in a range for which the perpendicular field component would dominate, is approximately present in a sliding contact hard disk drive system of the present invention having a gap G of 250 nm, an overcoat thickness $\lambda$ of about 150 Å, including surface roughness and lubricant, and an active media layer 33 with a thickness $\delta$ of 200 Å, or a half thickness of about 100 Å. By comparison, a conventional flying transducer having a similar gap spacing employed with a disk having a similar overcoat may have an additional spacing due to the flying height that adds perhaps 40 nm to 100 nm between the poletips and the media layer, pushing the gap-to-media spacing ratio to a level at which the maximum longitudinal field component felt by the media is larger than the corresponding perpendicular field component. For a disk with a media 33 composed of a number of thin multilayers and a roughly 10 nm overcoat 38 (including lubricant), the gap 27 may have a width G as small as 0.15 $\mu$m and still enjoy a gap-to-media spacing ratio of ten. Such a small gap spacing provides sharper field gradients which afford higher density recording and reading, and a gap as small as 0.10 $\mu$m and smaller may be employed to record and read perpendicularly stored data. The employment of media having a high perpendicular anisotropy and low noise is also beneficial, particularly for the situation in which the perpendicular write fields from the head do not clearly dominate.

As will be discussed below, data retrieval may be inductively accomplished or, preferably, a magneto-resistive (MR) reading element may be incorporated adjacent to the magnetic core. In the situation for which the MR element is separated from the core, the MR element senses perpendicular fields and thus receives a greater signal from perpendicularly magnetized media, rather than the perpendicular offshoots of longitudinally magnetized media, providing a clear advantage to perpendicular data storage. For a transducer which reads either inductively or with an MR element piggybacked to a magnetic core, the sensitivity of the head during reading will be proportional to the efficiency of that head during writing, via the rule of reciprocity. Moreover, the sensitivity of the head in reading signals involves head sensitivity fields that have a direction which mirrors that of the write fields of the head. Thus, just as the perpendicular component of the write fields tends to dominate the longitudinal component at head to media spacings that are a small fraction of the gap width, reading of the perpendicularly magnetized bits of the media is favored at such small head to media spacings, as the head sensitivity fields have a larger perpendicular than longitudinal component in this situation. An advantage of the extremely close head to media spacing afforded by the sliding contact head of the present invention can be seen by looking at the steep slope of the perpendicular field component 57 for distances less than, for instance, one-fourth of the gap width, and realizing that the increase in field strength afforded by such close spacing applies for reading sensitivity as well as writing strength, thus compounding the overall increase in performance of the head for reading after writing.

Figure 4:
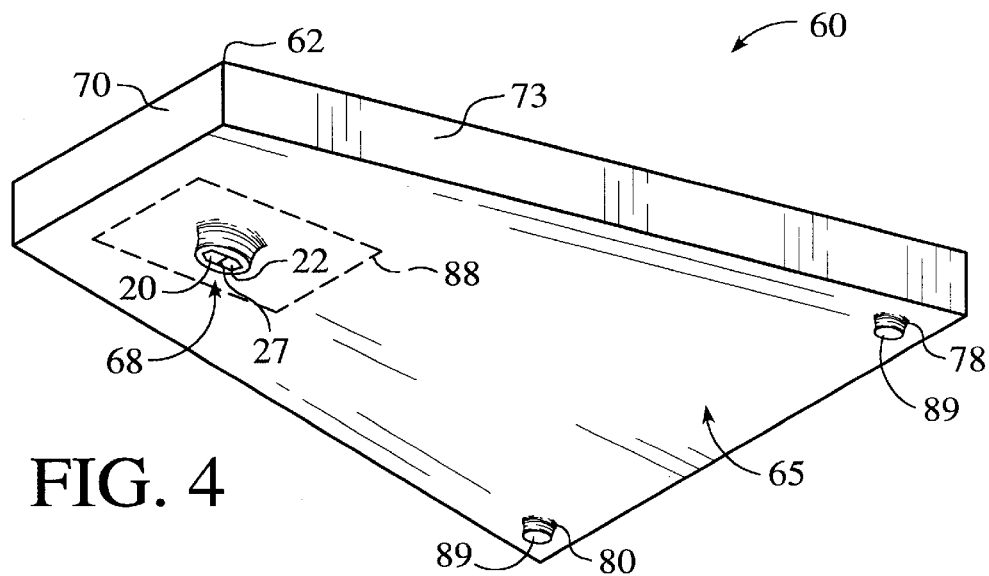
FIG. 4 is an enlarged perspective view of a generally plank-shaped embodiment of a transducer holding the poletips of FIG. 1 in one of three disk-facing projections.
Figure 5:
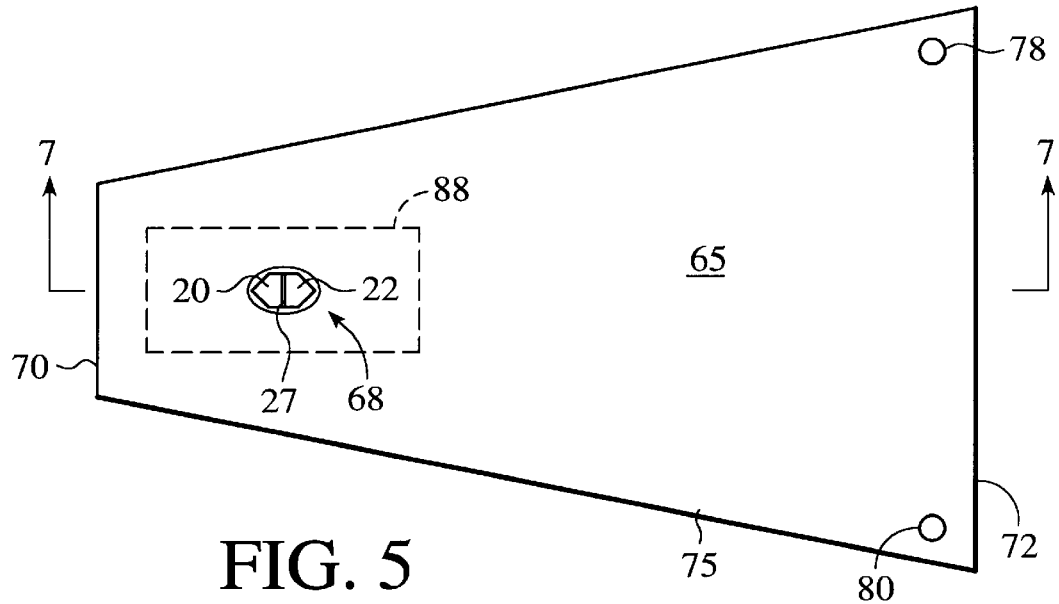
FIG. 5 is a bottom view of the transducer of FIG. 4.

Referring now to FIGS. 4 and 5, a greatly enlarged view of a transducer 60 which provides durably intimate head-media proximity, thereby enabling the perpendicular data storage system of the present invention, is formed as a generally trapezoidal chip 62 with a surface 65 designed to face a recording surface of a rigid magnetic storage disk. The transducer has a magnetically active pad (MAP) 68 that projects from the disk-facing surface 65 at a location adjacent to a first end 70 of the chip 62 and approximately equidistant between a right side 73 and a left side 75 of the chip. A pair of magnetically inactive pads (MIPS) 78 and 80 project from the disk-facing surface 65 adjacent to a second end 72 of the chip 62, MIP 78 being disposed about the same distance from side 73 as MIP 80 is from side 75. The three pads 68, 78 and 80 are spaced apart from each other to provide a stable support structure for the transducer 60, like a table with three short legs that can maintain contact with any conventional disk surface. An exposed pair of magnetic poletips 20 and 22 are located on a bottom surface of MAP 68, with an amagnetic gap 27 disposed between the poletips 20 and 22. The term "amagnetic" is used in the current invention to describe materials that are not ferromagnetic, including paramagnetic and diamagnetic materials. Preferably the gap is formed from a diamagnetic material so that a magnetic field across the gap is obstructed, encouraging a magnetic flux path that travels around the gap, increasing the perpendicular component of the field adjacent to the gap. The poletips 20 and 22 are ends of a loop-shaped core of magnetic material that is embedded in the chip 62 and not shown in this figure.

The loop-shaped core extends within a transduction section 88 further in the longitudinal direction than in the vertical or lateral direction, and is inductively coupled within that area 88 to a coil which winds repeatedly around the core, as will be seen in greater detail below. The protrusion of the poletips 20 and 22 from the disk-facing surface 65 allows the core to contact the disk, reducing the spacing between the core and the media layer of the disk while lifting the disk-facing surface of the chip 62 from the influence of the thin film of air moving with the disk. As will be seen, the entire chip 62 is constructed of a composite of thin films, and any bulk substrate which was used as a work surface for forming many thousands of such chips is removed after formation of the chips. This thin film composite chip 62 is much lighter than conventional hard disk drive sliders which include bulk substrate, the lighter weight decreasing the inertia of the chip and the power of impacts between the chip and a hard disk, thus reducing the probability of damage. Such a thin film composite transducer having poletips separated by a submicron gap and contacting a hard disk is also disclosed in parent U.S. Pat. No. 5,041, 932, along with perpendicular recording.

The chip 62 may have a thickness measured in the vertical direction between the disk-facing surface 65 and an opposed major surface, not shown in this figure, of between about 1 mil and about 5 mils, although other thicknesses may be possible, depending upon tradeoffs such as magnetic constraints and mass. The lateral width of this embodiment of the chip 62 is about 20 mils, although this width can vary by more than a factor of two and is set primarily by the separation of the MIPS 78 and 80 required for stability. The width can be much smaller about the MAP 68, as discussed below, while still encompassing the transduction section 88. The MAP 68 and MIPS 78 and 80 extend from the surface 65 an approximately equidistant amount, which may range between about 2 $\mu$m and 8 $\mu$m, which is sufficient to avoid aerodynamic lifting and to allow for gradual wear without engendering fracturing of those pads or instability of the transducer 60. The aerodynamic lifting force is believed to be primarily due to the disk-facing area of the chip which is in close proximity with the disk, including the contact area of the pads, and any bowing or tilting of the chip. As will be explained in greater detail below, the chip 62 may be intentionally bowed, tilted and/or etched to create a negative pressure region between the chip 62 and the spinning disk, so that the lifting force from the disk-facing area of the chip is more than overcome by downward force of the negative pressure. An area 89 of each of the MIPS 78 and 80 may be as small as 25 $\mu m^2$ or as large as about 1000 $\mu m^2$, although other sizes are possible based upon tradeoffs including, for example, friction, pad wear and manufacturing tolerances. An aspect ratio of the vertical height to the lateral or longitudinal width of those pads should not be much over 2/1 to avoid fracturing and transducer inefficiency. The length of the chip 62 of this embodiment as measured between the first end 70 and the second end 72 is about 40 mils, although this can be varied by a factor of two. This aspect ratio is determined primarily by mechanical considerations regarding the separation of the MIPS 78 and 80 and the MAP 68, as limited by the space needed for the transduction section 88.

Figure 6:
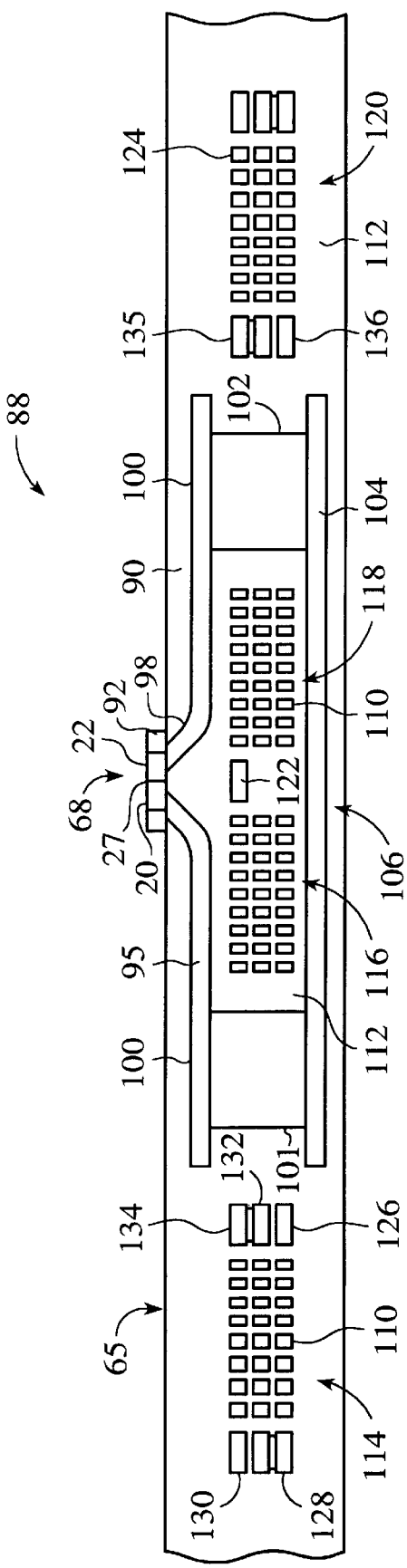
FIG. 6 is a cross-sectional view of a magnetically active portion of the transducer of FIG. 4.

In FIG. 6, a cross-section of the chip that focuses on the transduction section 88 is shown along a cross-section bisecting the MAP 68, the poletips 20 and 22 and the gap 27. A lower layer 90 which preferably is made of alumina, but which alternatively may be made of another electrically insulative, amagnetic material such as doped silicon, silicon dioxide or diamond-like carbon (DLC) forms the disk-facing surface 65, while a hard, wearable casing 92 which is preferably made of DLC or another hard amagnetic material such as silicon carbide or boron nitride forms the portion of the MAP 68 surrounding the poletips 20 and 22. The gap 27 is preferably formed of an insulative, amagnetic material such as silicon or silicon dioxide which is softer than the hard wear material of the casing 92. Hydrogenated carbon may also be a desirable gap 27 material, having a hardness that can be adjusted to correspond with the particular poletips 20 and 22, casing 92 and disk surface characteristics. The wear material of the casing 92 is preferably made of an amorphous material such as DLC which has a hardness similar to that of a surface layer of the disk with which the transducer 60 is to be employed, for matching wear between the transducer and the disk. The casing may be thicker closer to the disk-facing surface 65 for manufacturing and durability. Adjoining the poletips 20 and 22 is a bottom yoke 95 of magnetic material which extends symmetrically from a pair of slanted sections 98 to a pair of generally planar sections 100. The poletips 20 and 22 and yoke sections 98 and 100 are formed from permalloy or other known magnetic materials, while at least one of the poletips may include a high magnetic moment material, such as cobalt niobium zirconium (CoZrNb), iron nitride (FeN) or iron nitride alloys such as FeNAl adjacent to the gap 27. The yoke sections 98 and 100 are preferably formed in a laminated fashion, to be described below, in order to reduce eddy currents that impede transducer efficiency at high frequencies. Adjoining the yoke sections 100 are a pair of magnetic studs 101 and 102 that extend to a generally planar magnetic top yoke 104 interconnecting the studs 101 and 102. The poles 20 and 22, bottom yoke 95, studs 101 and 102 and top yoke 104 form a generally loop-shaped magnetic core 106, creating a contiguous magnetic circuit except for the small amagnetic gap 27. In a preferred embodiment discussed below, the studs are eliminated, and the core is formed in a shape having a cross-section that resembles a clamshell.

A series of electrically conductive coil sections 110 made of copper or other conductive metals or alloys is shown in cross-section in FIG. 3 to be spaced both within and without the magnetic core 106. Interspaced between the coil sections 110 and the core 106 is an electrically insulative spacer material 112 such as $Al_2O_3$, $SiO_2$ or a hardbaked photoresist or other polymer. The coil sections 110 can be seen to be divided into three generally horizontal layers in this embodiment, although more or less layers are possible, depending upon manufacturing and magnetic tradeoffs. These layers of coil sections 110 can also be seen to fall into four horizontally separate groups. Proceeding from left to right, these groups are labeled 114, 116, 118, and 120, with a crossover section 122 connecting groups 116 and 118. Although difficult to see in the cross-sectional view of FIG. 6, the coil sections 110 are in actuality a single coil 124 which winds repeatedly about first one and then the other of the two studs 101 and 102. The groups 114 and 120 which are disposed outside the core 106 have an electric current during writing or reading which is directed into or out of the plane of the paper opposite to that of groups 116 and 118 and crossover section 122. The reader may wish to jump ahead temporarily to FIG. 17, which shows a top view of one layer of the spiraling coil 240 much like coil 124, including crossover section 339, corresponding to crossover 122.

Thus a current traveling into the plane of the paper at coil section 126 would spiral in the layer of that section 126 around stud 101 with a generally increasing distance from the stud 101 until reaching coil section 128, which is connected to section 130 of the next layer. The current would then spiral inwardly about stud 101 in the layer of section 130 until reaching section 132, which is connected to section 134 of the next layer. The current would then spiral outwardly around stud 101 in the layer that includes section 134 until reaching crossover section 122, at which point the current would begin to spiral inwardly about stud 102, traveling to the second layer at section 135. The layered spiraling of the current around stud 102 would continue in a similar but converse fashion to that described above for the spiraling about stud 101, until the current exited the coil structure by traveling out of the plane of the paper at section 136. The coil 124 thus resembles interconnected stacks of pancake-shaped spirals centered about studs 101 and 102.

Representative dimensions for this embodiment include an approximately 3 µm thick bottom yoke 95 and a top yoke 104 that is about 4 µm in thickness, and studs 101 and 102 which each extend vertically about 23 µm between the yokes. The thickness of the bottom yoke 95 is selected to saturate at a somewhat lower magnetic flux than the poletips, thus limiting the flux through the poletips and avoiding broadening of the transition that would occur during poletip saturation. In order to achieve this flux limiting effect with poletips of different sizes and materials, a function can be employed to determine the optimum bottom yoke parameters. The individual coil sections 110 are about 3.5 µm thick measured in the vertical direction, and have a center to center spacing of about 5.5 µm in that direction. Longitudinally, those sections 110 may be about 2 µm to 4 µm thick within the core 106 with a center to center spacing of about 4 µm. The top yoke 104 extends about 169 µm longitudinally, and the bottom yoke 95 extends similarly but is, of course, split up by the poletips 20 and 22 and gap 27.

Figure 7:
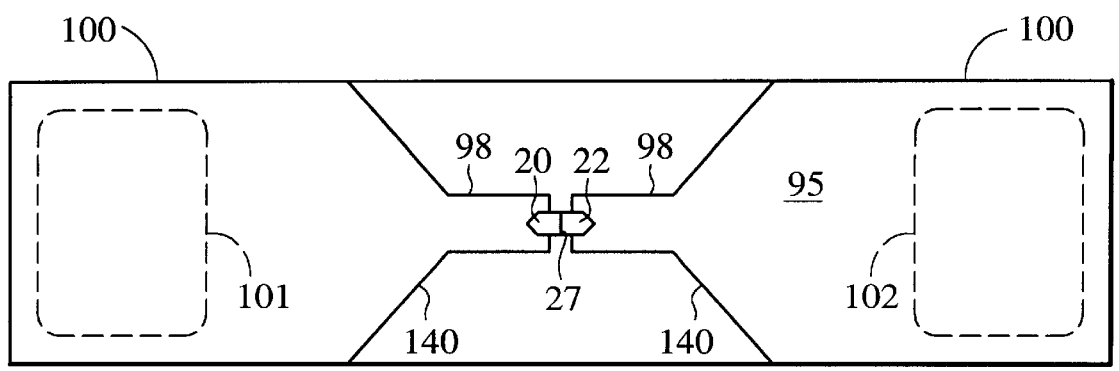
FIG. 7 is an opened up bottom view of the magnetically active portion of FIG. 6.

In FIG. 7, a top view diagram of the magnetic core 106 shows that the bottom yoke 95 is shaped like a bow-tie, as the slanted sections 98 are much narrower in lateral dimension than the planar sections 100. Diagonal tapered portions 140 of the planar sections 100 funnel magnetic flux into the narrower section 98 during a write operation and offer a low reluctance path for such flux during a read operation. Centered atop the slanted sections 100 are the poletips 20 and 22, which are separated by the amagnetic gap 27. The planar sections 100 have a width, excluding the tapered sections 100, of about 42 µm, which tapers at about a 45 degree angle to a width of about 7 µm at the slanted sections 98. The studs 101 and 102 meet the planar sections 100 distal to the poletips 20 and 22.

Figure 8:
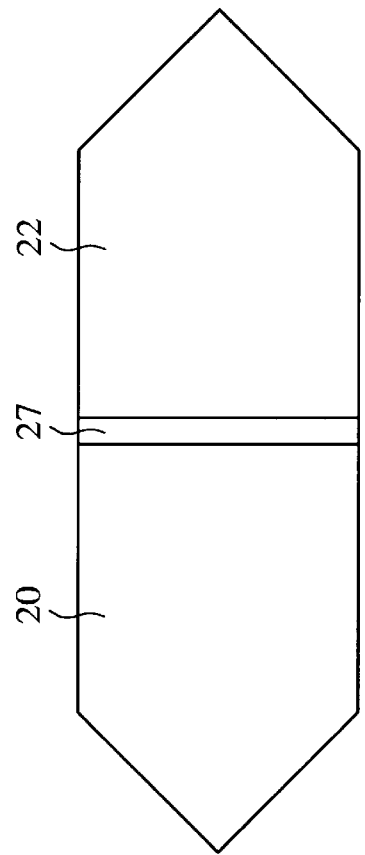
FIG. 8 is a further enlarged bottom view of the magnetic pole structure of FIG. 7.

An even more enlarged view in FIG. 8 shows that the poletips 20 and 22 are shaped like baseball homeplates that nearly meet along parallel sides, separated by the long, narrow gap 27. The poletips 20 and 22 and gap 27 are exactingly tailored to precise dimensions that are chosen based on a number of parameters. The specific embodiment depicted in FIG. 8 has poletips that each measure 3.25 µm in the lateral dimension and 4 µm in the longitudinal direction, before tapering to extend another 2 µm longitudinally. The peak-to-peak longitudinal dimension of the poletips 20 and 22 and gap 27 is 12 µm. The gap 27 of this embodiment has a precisely defined longitudinal dimension of 0.26 µm and a lateral dimension of 3.25 µm. As mentioned above, the longitudinal gap 27 dimension may be as small as 0.10 µm or less for extremely high density perpendicular data storage applications.

Referring again to FIGS. 1 and 2, it is apparent that the perpendicular field component 52 felt by the media 33 has an opposite direction adjacent to poletip 20 compared to that adjacent to poletip 22. As long as the perpendicular field component 52 magnitude is sufficient to easily magnetize the media 33, the opposite direction of the field does not present a problem, since the field adjacent to the trailing poletip 22 will write over the magnetization of the media induced by the leading poletip 20. It is advantageous for high coercivity media, however, to transmit a stronger perpendicular field adjacent to the trailing poletip 22 than that adjacent to the leading poletip 20. Although this may be accomplished, for example, by creating an asymmetric pair of poletips such that the gap therebetween is angled rather than perpendicular to the media layer 33, a preferable means for achieving a stronger write field is to sandwich a layer of high magnetic saturation material between the gap and the remainder of the trailing poletip.

Figure 9:
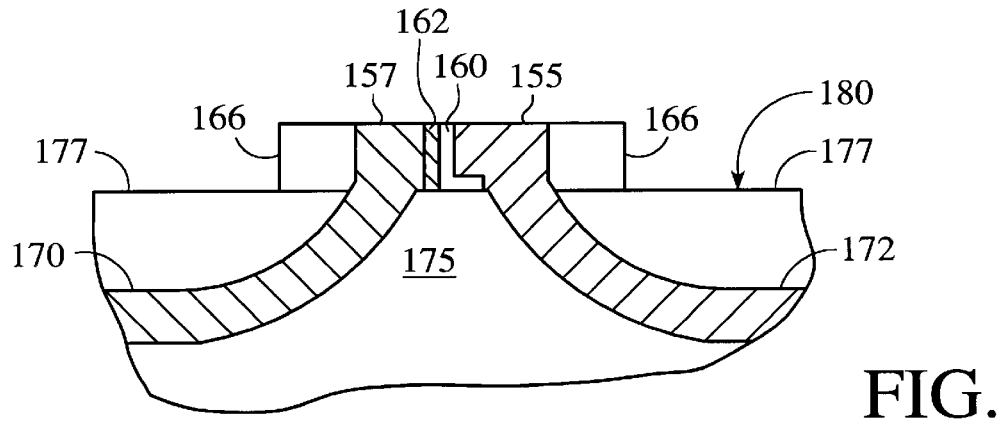
FIG. 9 is a fragmentary cross-sectional view of an embodiment having a pole structure including a high magnetic saturation material adjoining the gap and one of the poletips.

A cross-section of such a pair of poletips 155 and 157 separated by an amagnetic gap 160 and a high $B_s$ layer 162 is shown in FIG. 9. High $B_s$ layer 162 is formed of Fe(Al)N or other known high $B_s$ material, and magnetically acts as a part of trailing poletip 157 that does not saturate at flux levels significantly higher than those which induce saturation of leading poletip 155. Gap 160 is formed of silicon or other amagnetic material having suitable wear characteristics. Surrounding poletips 155 and 157, gap 160 and high $B_s$ layer 162 is a hard, durable material 166 such as amorphous diamond-like carbon, which is constructed for lasting operational contact with a spinning rigid disk. Also shown in this figure are bottom yoke sections 170 and 172 of the magnetic core, an amagnetic pedestal 175 upon which the yoke sections are formed, and an amagnetic isolation layer 177 that forms a disk-facing surface 180. During writing, a magnetic field is induced in the core preferably at a strength which saturates the leading poletip 155 without saturating the high $B_s$ 162 layer of the trailing poletip, so that the field felt by the media is more spread out adjacent to the leading pole 155 than the concentrated field adjacent to the high $B_s$ layer 162 of trailing poletip 157. The shape of a magnetic pattern written on the disk depends substantially upon the shape of high $B_s$ layer 162, which is formed as a thin film having a longitudinal thickness of between 100 nm and 400 nm, a lateral thickness approximately equal to the track width of 3.25 µm, and a vertical depth of 3 µm to 8 µm. Alternatively, a high $B_s$ layer may be formed on both edges of the gap to enhance writing gradients for the situation in which the resulting trailing write fields are sufficient to easily overcome the magnetization of the media caused by the leading edge.

Figure 10:
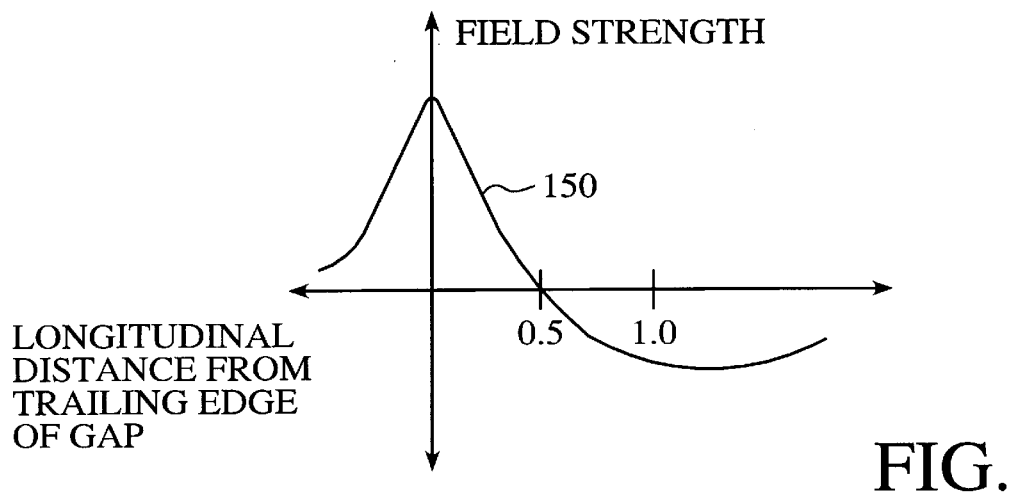
FIG. 10 is a plot of the field strength of the embodiment of FIG. 9.

FIG. 10 shows a perpendicular component 150 of a write field transmitted from a head having a high $B_s$ layer adjoining a trailing poletip and felt by a media layer located at about one-tenth the gap distance from the head. As in FIG. 2 the longitudinal distance is given in units of gap width G, so that zero represents the trailing edge of the gap adjoining the high $B_s$ layer, and one represents the edge of the gap adjoining the leading poletip. As can be seen, the field adjacent to the trailing poletip reaches a much higher value than that adjacent to the leading poletip, so that the media is magnetized with the trailing signal without remnant magnetization left from the oppositely directed leading field.

Figure 11:
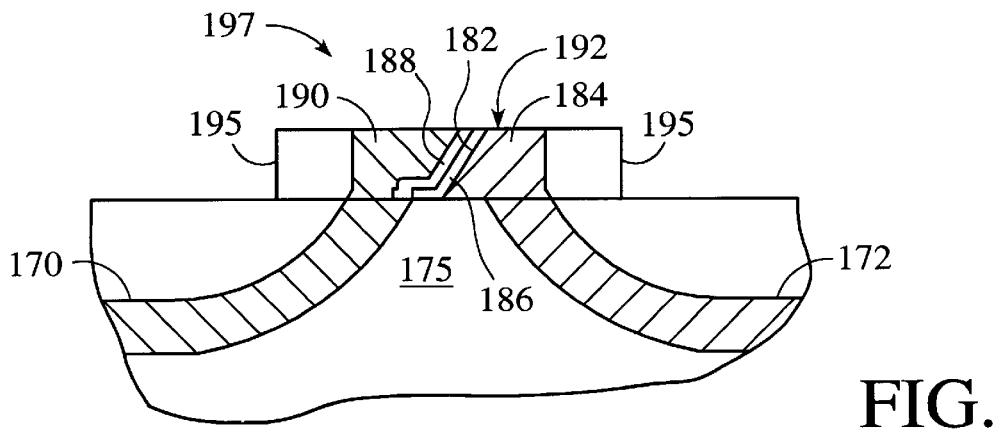
FIG. 11 is a fragmentary cross-sectional view of an embodiment having a pole structure including a high magnetic saturation material adjoining a slanted gap and one of the poletips.

FIG. 11 shows another embodiment of the MAP that provides an assymetric write field for perpendicular recording. To construct this embodiment atop the bottom yokes sections 170 and 172, pedestal 175 and insulation layer 177 that were shown in FIG. 9, a photoresist is patterned atop a sputtered conductive seed layer of NiFe so that the resist has an angled overhang that causes the formation of a slanted edge 182 during plating of a first pole layer which will be subsequently etched to form first poletip 184. An amagnetic gap 186 of silicon is then sputtered on the slanted edge 182, on top of which a coating of high $B_s$ material 188 is deposited. A second poletip 190 is then formed by first electroplating, then lapping to create a surface 192 coplanar with first pole section 184, and then angled IBE as described above to define vertical, skirted edges of poletips 184 and 190. Durable wear material 195 such as amorphous, diamond-like carbon then encases the poletips 184 and 190, which is then etched and lapped to expose the poletips 184 and 190, completing the formation of assymetric MAP 197. The slanted edge 182 facilitates uniform sputtering of the gap 186 and high $B_s$ coating 188, as compared to the angled sputtering described above for the vertically oriented gap 160 and high $B_s$ coating 162 depicted in FIG. 9. The angled photoresist overhang which affords formation of the slanted edge 182 can be formed by a number of methods, including the use of either positive or negative photoresists and either angled coherent or incoherent light.

Figure 12:
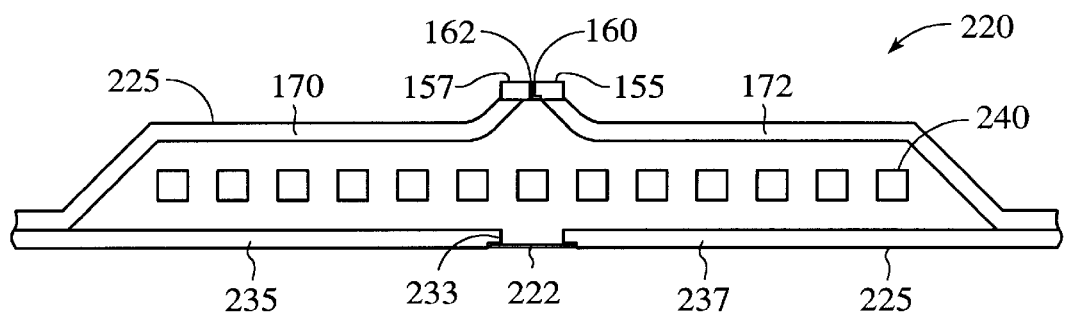
FIG. 12 is a cross-section of the embodiment of FIG. 9 and including a magnetoresisitve sense element adjacent to the magnetic core and distal to the pole structure.

Further improvement to the sliding ring head and perpendicular medium information storage system can be achieved by modifying the transducer of the above described contact planar ring head to include a magneto-resistive (MR) sensor, such a modified transducer 220 being shown in cross-section in FIG. 12, the orientation of the cross-section being similar to that of the inductive-only transducer 88 shown in FIG. 6. In the embodiment of FIG. 12, an MR element 222 piggybacks the loop shaped core of magnetic material 225 on a side opposite to the poletips 155 and 157. A gap 233 separates a top yoke of the core 225 into first and second top yoke sections 235 and 237, providing an increase in magnetic flux passing through MR element 222 during reading of data. Since the poletips 155 and 157 are closest to the disk during operation, the yoke sections 235 and 237 are termed top yokes, while the pair of yoke sections adjacent to the poletips are termed bottom yoke sections 170 and 172. Only a single layer of coils 240 is employed in this embodiment, which is sufficient for creating a large flux in the core 220 during writing, additional coil layers of the previous inductively-sensing transducer 88 embodiment not being needed due to the MR sensing element. The bottom yoke sections 170 and 172 connect the top yoke sections 235 and 237 and the poletips 155 and 157 via a series of shallow, slanted steps, providing a low reluctance magnetic path which is especially helpful for high frequency operations. The amagnetic gap 160 and high $B_s$ layer 162 provide a sharp magnetic transition adjacent to the border between that gap and high $B_s$ layer.

Coupling the MR sensor 222 to the magnetic core 225 far from the poletips 155 and 157 has a number of advantages over conventional MR elements. First, the resistance of MR sensors is known to depend greatly upon temperature, which may produce spurious readings of the sensor due to temperature rather than magnetic fluctuations. This temperature sensitivity is particularly problematic for transducers which contact the media, as the friction and thermal conductivity created by contact with the media can result in a thermally induced bias signal that can conceal the magnetic signal desired to be read. The placement of the MR sensor of the current embodiment far from the disk-contacting poletips 155 and 157 and well within the interior of the thin-film slider that contains the transducer insulates the sensor from thermal fluctuations, which can improve the magnetic signal to thermal noise ratio by several orders of magnitude. In addition, piggybacking the sensor 222 to the magnetic core 225 allows the same poletips that write data to the disk to read that data from the disk, eliminating misregistration problems that occur in the prior art due to placement of the MR reading element apart from an inductive writing element, an advantage that is particularly helpful at high skew angles. Moreover, since the MR element is typically very thin and is insulated in this embodiment from the core by another very thin layer, uniformity and purity of those layers is important. Surface irregularities and contaminants typically build up with each additional layer of the transducer 220, which is constructed in layers generally from the top yoke sections 235 and 237 to the poletip 155. The MR stripe 222 is one of the first layers formed in transducer 220, and benefits from the surface uniformity and lack of contamination available at that incipient stage. Finally, removing the electrically active MR element from exposure to the disk prevents shorting of that element to the disk surface.

Figure 13:
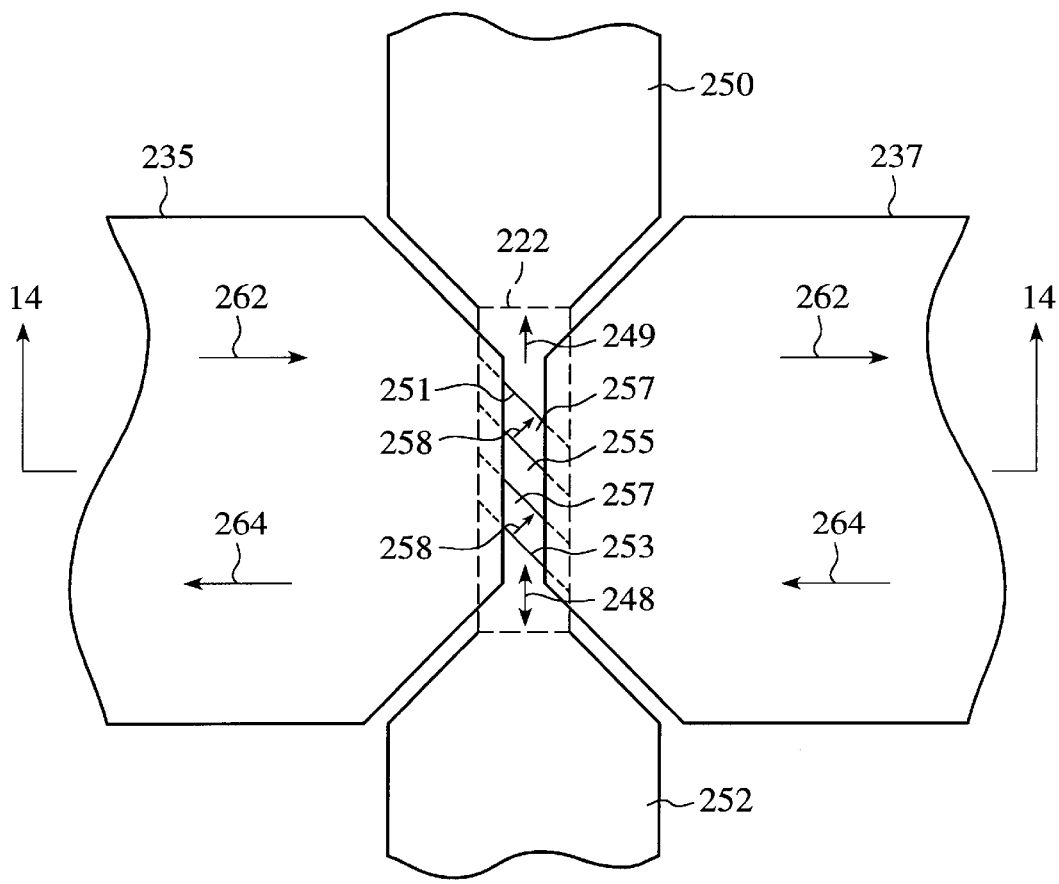
FIG. 13 is an opened up top view of the magnetoresisitve sense element and magnetic core of FIG. 12.

FIG. 13 shows a top view of the MR sensor 222 and top yoke sections 235 and 237 of the magnetic core 225, as they appear during construction of the core prior to the formation of the coil layer. The MR stripe 222 is formed first, atop a planar layer of alumina which has been patterned in areas not shown in this figure to provide electrical interconnection for the coils and the MR element. The MR stripe 222 in this embodiment is made of a permalloy (approximately $Ni_{0.8}Fe_{0.2}$) layer formed to a thickness of about 200 Å and having an easy axis of magnetization along the directions of double headed arrow 248, the permalloy layer then being covered with a patterned photoresist and ion beam etched to define a generally rectangular shape extending about 5 $\mu$m longitudinally and about 30 $\mu$m laterally, although the exact dimensions of the stripe may vary from these figures by 50%, depending upon tradeoffs involved in maximizing efficiency and stability. Next, a conductive pattern is formed which provides a pair of conductive leads 250 and 252 to the MR stripe 222, the leads having respective slanted edges 251 and 253 which are parallel with each other. A bias layer of a permanent magnet or an antiferromagnetic material such as FeMn optionally underlies the conductive pattern adjoining the MR stripe 222, in order to pin the magnetization of that stripe in the direction of arrow 249. An optional conductive bar 255 or bars shaped as a parallelogram having sides parallel to edges 251 and 253 is disposed atop MR stripe 222 between leads 250 and 253, and additional spaced apart bars may be formed having sides parallel to edges 251 and 253. The leads 250 and 252 and any intervening conductive bars 255 are so much more electrically conductive than the MR stripe 222 that an electrical current between leads 250 and 252 in sections 257 of the MR stripe not adjoining leads 250 and 252 or bar 255 flows along the shortest path between the slanted edges 251 and 253 and bars as shown by arrows 258, essentially perpendicular to those edges and the parallel sides of the intervening bars 255 and at a slant to the easy axis direction 249.

The magnetoresistance of the MR stripe 222 varies depending upon an angle $\theta$ between the magnetic field and the current in the stripe such that the resistance is proportional to $\cos^2\theta$. In the absence of a magnetic field from the yoke sections 235 and 237, the angle between the easy axis 249, along which the magnetization of the stripe 222 is directed, and the current in magnetoresistive sections 257 as shown by arrow 258, is between 0° and 90° and preferably near 45°. Upon exposure of the poletips 227 and 230 to a magnetic pattern in a disk that results in a magnetic flux in the yoke sections 235 and 237 along a direction shown by arrows 262 the magnetic moment of the stripe 222 is rotated in a direction more parallel with current arrows 258 so that the magnetoresistance in sections 257 approaches zero. On the other hand, when the pattern on the disk creates a magnetic flux in the yoke sections 235 and 237 in the direction of arrows 264, the magnetic moment within MR stripe 222 is rotated to become more nearly perpendicular to current 258 within resistive sections 257, so that magnetoresistance in those sections 257 rises. This differential resistance based upon the direction of magnetic flux in yoke sections 235 and 237 creates a voltage difference which is used to read the information from the disk.

Figure 14:
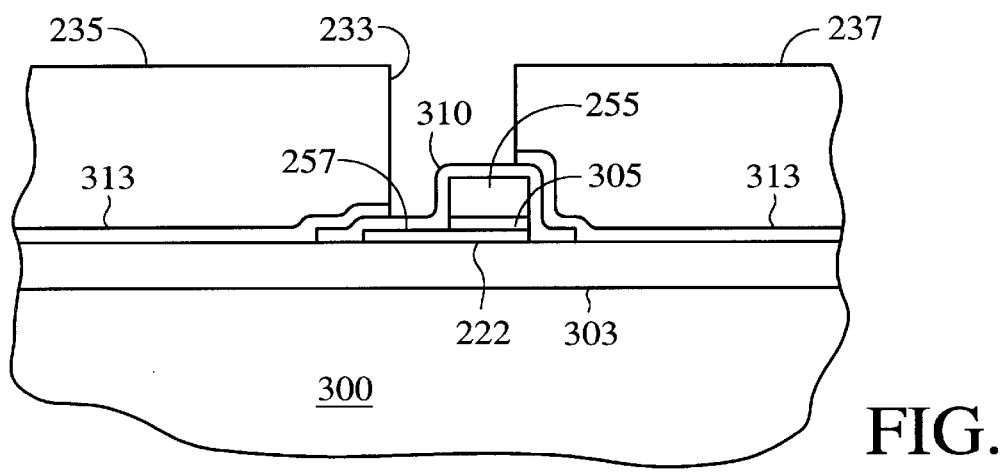
FIG. 14 is an enlarged cross-sectional view illustrating the formation of the magnetoresisitve sense element and magnetic core of FIG. 13.

A process for constructing the transducer 220 is shown beginning FIG. 14. A conventional wafer substrate 300 of silicon, alsimag or other known materials is used to form many thousand of the sliders 62 of FIG. 4, each containing at least one such transducer 220, after which the sliders are separated from each other and from the wafer. Separation of the sliders 62 from the wafer is accomplished by selective etching either of the wafer or of a release layer such as copper formed atop the wafer before the sliders are formed. The formation of the sliders 62 proceeds in layers generally from a back side of the slider designed to face away from the disk to the disk-facing side of the slider. Initially, electrically conductive interconnects for the coils 240 and MR element 222 are formed of gold, including four spaced apart terminals that protrude from the back side and provide mechanical as well as conductive connections to a gimbal and flexure beam structure.

A layer of alumina 303 has been sputtered onto the silicon substrate 300 and is then polished and cleaned to provide a planar surface. An MR layer of Permalloy is then formed in the presence of a magnetic field by sputtering or ion beam deposition to a carefully controlled thickness of about 200 Å, the field creating an easy axis of the Permalloy film into or out of the plane of the paper of FIG. 14. A photoresist is then distributed atop that film and patterned to protect MR stripe 222 while the remainder of the Permalloy is removed by ion beam etching (IBE). The MR stripe 222 is then covered with another photoresist that is patterned to cover slanted portions of the stripe corresponding to barber pole shaped MR sections 257 of FIG. 13. A bias layer 305 of antiferromagnetic material such as FeMn is then deposited which pins the easy axis of the MR stripe in a single direction, as shown by arrow 249 of FIG. 13. A conductive material such as copper is then deposited atop the bias layer 305 forming the conductive pattern shown in FIG. 13 including bar 255. The photoresist that had covered areas such as 257 and layer 303 is then removed, taking with it any bias layer 305 and conductive layer that had been disposed on top of the photoresist. A protective layer 310 of alumina is the deposited atop the MR element 222, bar 255 and alumina layer 303 to a thickness in a range between 125 Å and 1000 Å. A photoresist is then distributed atop layer 310 and patterned to protect that portion of layer 310 covering MR stripe 222 and conductive bar 255, while the remainder of that layer is removed by wet etch or IBE.

Another photoresist layer is then patterned to cover a central portion of the insulation 310 above bar 255 and MR section 257. A NiFe seed layer 313 is then sputtered to a thickness of about 1000 Å, whereupon a solvent is applied to remove the resist and to lift off any seed layer disposed on the resist. This photoresist lift-off process avoids the need for etching or other removal of the thin seed layer that would otherwise exist atop the central portion of insulation layer 310, and thus avoids damage to that layer and the MR elements below. Top yoke sections 235 and 237 are then formed by window frame plating with gap 233 left between those sections disposed above the central portion of MR stripe 222. Yoke sections 235 and 237 overlap MR stripe 222 so as to minimize the interruption of magnetic flux between the yoke sections 235 and 237 and the MR stripe 222. One should note that although a single MR stripe is shown, a connected series of such MR stripes may cross back and forth adjacent to the top yoke in order to increase the measurable magneto-resistance.

Figure 15:
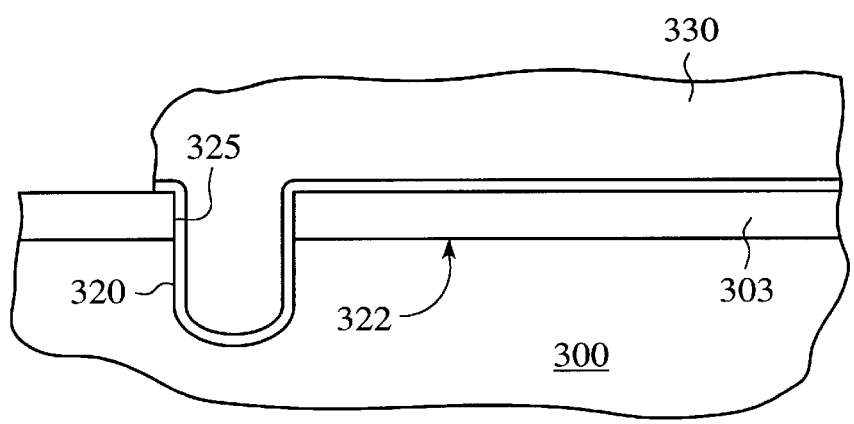
FIG. 15 is an enlarged cross-sectional view illustrating the formation of a conductive terminal and lead to connect with the magnetoresisitve sense element of FIGS. 11–13.

FIG. 15 shows a portion of the substrate removed somewhat from and preferably formed subsequently to the MR stripe 222 and yoke sections 235 and 237 in order to illustrate an electrical and mechanical interconnection 320 that, after eventual removal of the substrate, will protrude from the non-disk-facing surface 322 of alumina layer 303. The layer 303 is covered with a patterned photoresist which exposes areas of that layer for etching holes 325, the holes being extended into the substrate 300 by reactive ion etching (RIE) to form molds for the protruding terminals 320, which are then seeded with a TiCu layer 327 while the yoke sections 235 and 237 and MR stripe 222 are covered with a photoresist, after which another photoresist is patterned and copper is plated to define leads 330 as well as interconnect terminals 320. Two of the leads 330, of which only one is shown, connect with the conductors 250 and 252, while another pair of leads provide connection to the electrical coil 240.

Figure 16:
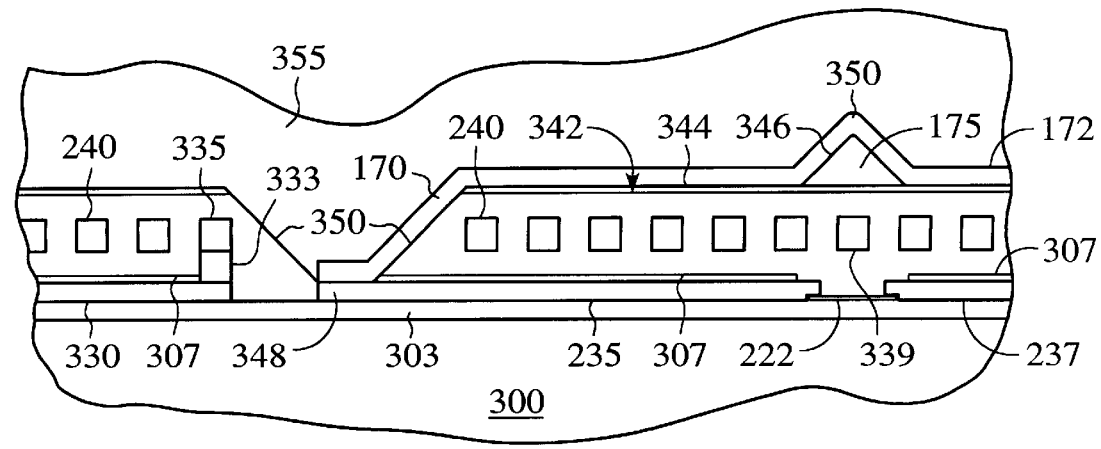
FIG. 16 is a cross-sectional view shows later steps in the formation of the embodiment of FIG. 12.

FIG. 16 focuses on one half of generally symmetric transducer 220 in order to better illustrate its formation. After formation of the yoke sections 235 and 237, MR stripe 222 and conductive lead 330, an approximately 1500 Å thick etch stop layer 307 is then deposited and selectively etched by RIE to remove portions of that layer 307 over the MR stripe 222. A conductive segment 333 is then plated atop an end of lead 330 while the rest of the construction is covered with photoresist. After that, an alumina layer is deposited, which is then lapped and cleaned to form a planar surface upon which coil 240 is formed by through plating a spiral pattern of photoresist.

Figure 17:
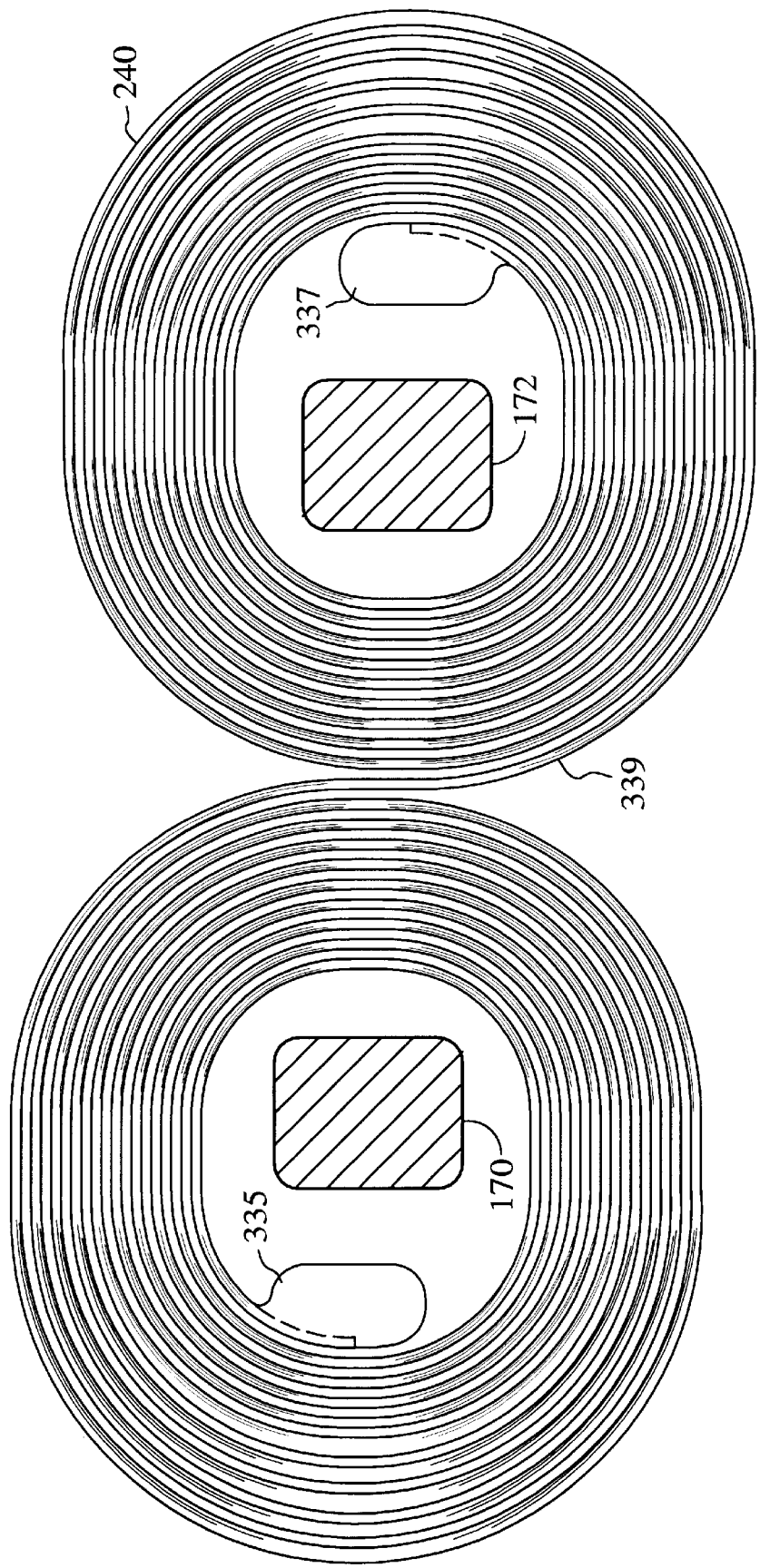
FIG. 17 is an opened up top view of the coil layer of the embodiment shown in FIGS. 11 and 14.

A top view of coil section 240 is shown in FIG. 17. An inner section 335 of coil 240 is connected to segment 333, while a similar section 337 is connected to another segment, not shown, which is connected via a lead similar to lead 330 to the exterior of the chip. Coil 240 spirals outwardly around yoke section 170 until crossing over at section 339 to spiral about yoke section 172.

Referring again to FIG. 16, another layer of alumina is deposited which encases and covers coil section 240, the alumina layer then being lapped and cleaned to form a planar surface 342, upon which an etch stop layer of silicon carbide is formed. Atop the SiC etch stop layer 344 a thicker layer of alumina is deposited, which is then planarized, masked with a patterned resist layer and isotropically etched to form pedestal 175 having slanted sides 346. The exposed etch stop layer 344 is then covered with a photoresist patterned with a hole above an end of yoke section 348, after which an IBE or RIE removes the exposed portion of etch stop 344. An isotropic etch through the etch stop hole and a photoresist pattern results in sloping alumina sides 350. The end 348 is then exposed by RIE or IBE removal of lower etch stop layer 307. Next, a bottom yoke 350 is formed by window frame plating on the end 348 of bottom yoke section 235 and over the terraced insulation that peaks atop pedestal 175, providing a low profile, low reluctance magnetic path that projects above the pedestal. After deposit of another thicker alumina layer 355 atop the structure of FIG. 17, that layer is lapped flat to a level exposing pedestal 175 and separating bottom yoke sections 170 and 172.

Figure 18:
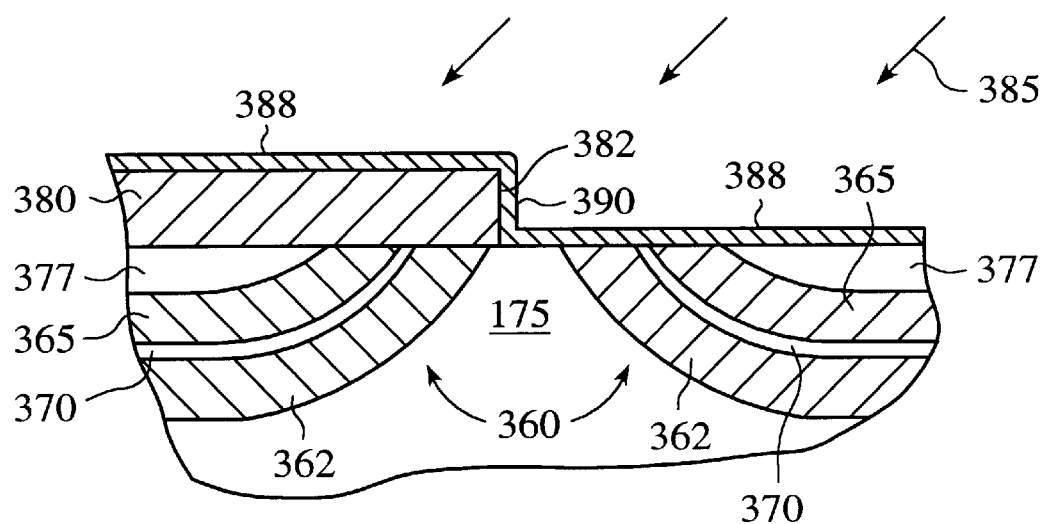
FIG. 18 is a cross-sectional view illustrating a subsequent stage in the formation of the embodiment of FIG. 12 that focuses on the construction of the high magnetic saturation layer of FIG. 9.

FIG. 18 focuses on the process for making the poletips which adjoin the pedestal and incorporate a high $B_s$ layer in the trailing poletip adjoining the gap, some advantages of which were discussed above. Instead of the solid yoke 350 layer shown in the previous figure, laminated bottom yoke 360 is made of a pair of magnetic layers 362 and 365 of permalloy formed by window frame plating with a thinner amagnetic layer 370 of alumina formed by sputtering disposed between the magnetic layers. The yoke 360 curves upward as before due to its formation atop the amagnetic pedestal 175. The magnetic layers 362 and 365 each have a thickness of 1 μm to 3 μm, while the amagnetic layer 370 has a thickness between 100 and 200 nm. Another amagnetic, insulative layer 377, preferably formed of alumina, is deposited atop the yoke layers 362 and 365, and then those layers are lapped to form a predetermined separation in the yoke layers atop the pedestal 175, as discussed above with regard to layer 355. A first pole layer 380 is then formed by window frame plating of permalloy on a NiFe seed layer, providing an essentially vertical edge 382 to that pole layer. A high magnetic saturation material such as cobalt zirconium niobium or FeAl(N) is then sputtered at an angle 385 to form horizontal layers 388 and a vertical layer 390 of high $B_s$ material adjoining edge 382.

Figure 19:
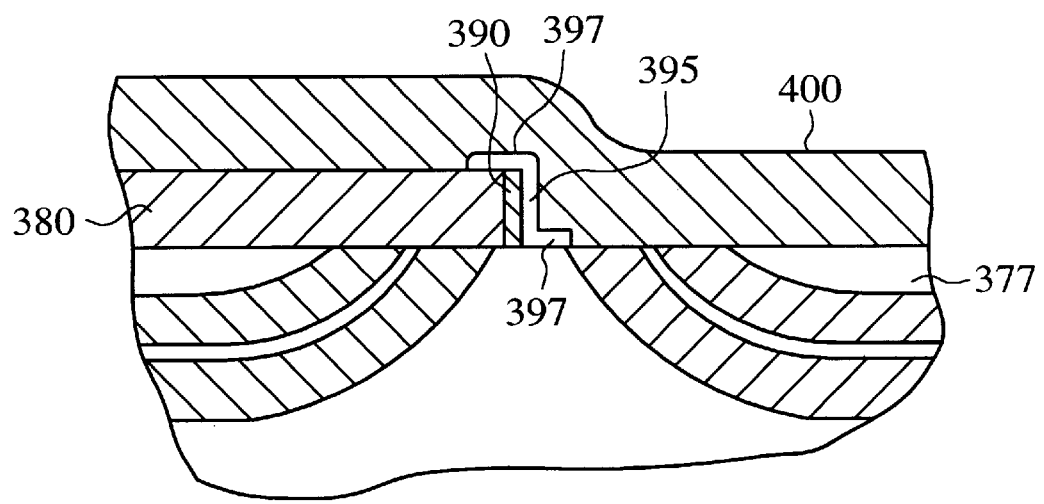
FIG. 19 is a cross-sectional view illustrating a subsequent step in the formation of the embodiment of FIG. 12 that focuses on the construction of the gap of FIG. 9.
Figure 20:
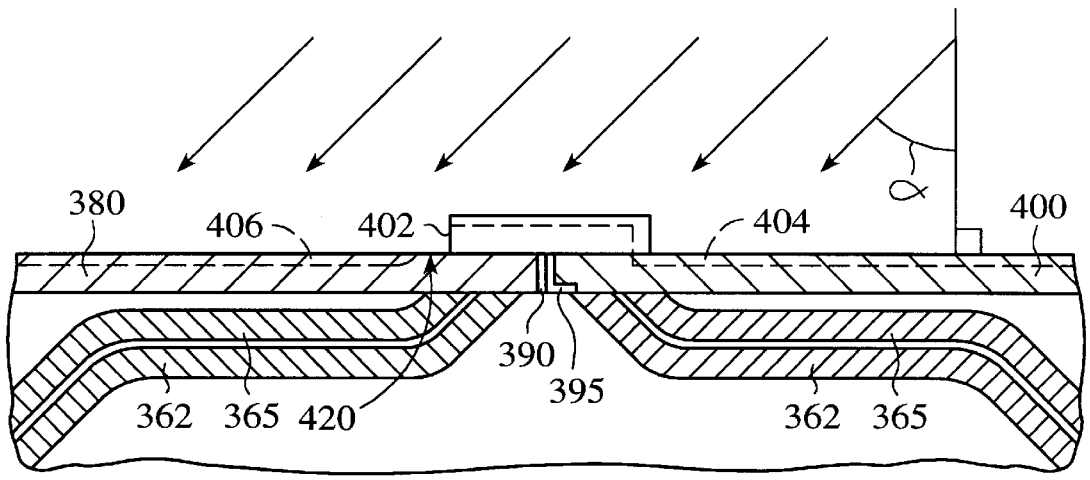
FIG. 20 is a cross-sectional view illustrating a later step in the formation of the embodiment of FIG. 12 that focuses on the construction of the poletips of FIG. 9.

Referring now to FIG. 19, the horizontal layers 388 have been removed by a vertically directed ion beam etch (IBE) leaving the slightly shortened vertical layer 390 of high $B_s$ material. Layer 390, which has a precisely controlled longitudinal thickness that may range between 100 nm and 400 nm, is to become the portion of the head through which the highest flux passes during writing, and so the shape of this layer 390 is important in determining the bit shape written on the medium. Vertical layer 395 and horizontal layers 397 of amagnetic material such as alumina, silicon or silicon dioxide are then formed by angled sputtering in a similar fashion as that described above for the high $B_s$ material, after which the horizontal layers 397 are masked and etched to leave the "S" shape shown. A second pole layer 400 is subsequently electroplated, after which lapping is used to remove the portion of that pole layer atop the first pole layer 380 and the upper horizontal layer 397, leaving the vertical portion 395.

As shown in FIG. 19, the pole layers 380 and 400 are then masked with slightly oversized photoresist pattern 402 of the poletips 20 and 22, not shown in this figure, after which a rotating IBE is performed at an angle α, removing the photoresist at about the same rate as the exposed pole layers, as shown by dashed lines 404 and 406, to create the home-plate-shaped pair of poletips with the vertical portion 395 left to serve as the gap 27. The angled, rotating IBE leaves the poletips 20 and 22 with vertical outside walls that rise from an angled skirt that is caused by shadowing during the angled IBE, the skirt providing an improved substrate for the subsequent formation of hard, durable material such as diamond like carbon that encases the poletips and, like the poletips, slides on the disk.

Figure 21:
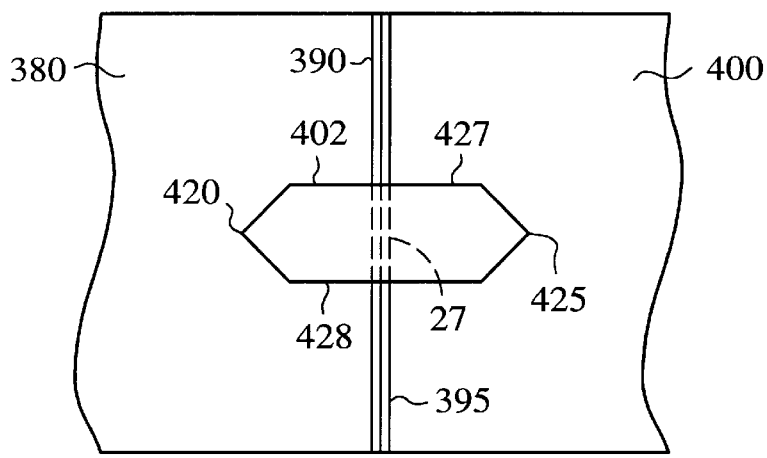
FIG. 21 is a top view of the poletip construction of FIG. 20.

Referring additionally now to FIG. 21, the photoresist mask 402 has been formed in the elongated hexagonal shape desired for the poletips 20 and 22 and gap 27, however, the mask 402 is larger than the eventual poletip area, to compensate for removal of a portion of the mask during etching. The etching is done by IBE with the ion beam directed at a preselected angle a to the surface of the pole layers 380 and 400, while the wafer is rotated, in order to form vertical sides of the poletips 20 and 22, aside from a tapered skirt 413, shown in FIG. 22, of the poletips 20 and 22, the skirt 413 acting as an aid to the subsequent formation of the hard wear material 52 that will surround the poletips. The vertical sides of the poletips 20 and 22 allows operational wear of the poletips to occur without changing the magnetic read write characteristics of the head. On the other hand, the skirt 413 allows the wear material 433 that wraps around the poletips 20 and 22 to be formed without cracks or gaps which can occur, for example, in depositing DLC, preferably by plasma enhanced chemical vapor deposition (PECVD) onto a vertically etched pair of poletips 20 and 22. Although this tapered skirt 413 can be achieved by a variety of techniques, an angled, rotating IBE is preferred to exactingly tailor the vertical poletips 20 and 22 with tapered skirts 413.

The photoresist mask 402 has an etch rate that is similar to that of the NiFe pole layers 380 and 400, so that when the angle a is approximately 45° the pole layer 404 and the mask 415 are etched a similar amount, as shown by dashed 404. Pole layer 380, however, is partially shielded from the angled IBE by the mask 415, so that a portion 420 of layer 380 that is adjacent to the mask is not etched, while another portion is etched as shown by dashed line 406. As the wafer substrate is rotated, not shown, pole layer 400 will have a non-etched portion 425 adjacent to an opposite end of the elongated mask 402, as will areas 427 and 428 adjacent sides of the elongated mask. Since areas 427 and 428 are adjacent larger widths of the mask 215 than areas such as 220 and 225 and are thus more shielded and etch slower, the rotation of the wafer is preferably slower during periods when the IBE is angled along the elongated length of the mask (closest either to portion 420 or 425). The angle a may be changed to further control the shaping of the poletips 20 and 22, for example to employ a greater angle such as about 60° toward the end of the IBE. This rotating, angled IBE is continued for an appropriate time to create a pair of poletips 20 and 22 having vertical sides with a tapered skirt 413 and a flat, elongated hexagonal top substantially centered about the gap 27.

Figure 22:
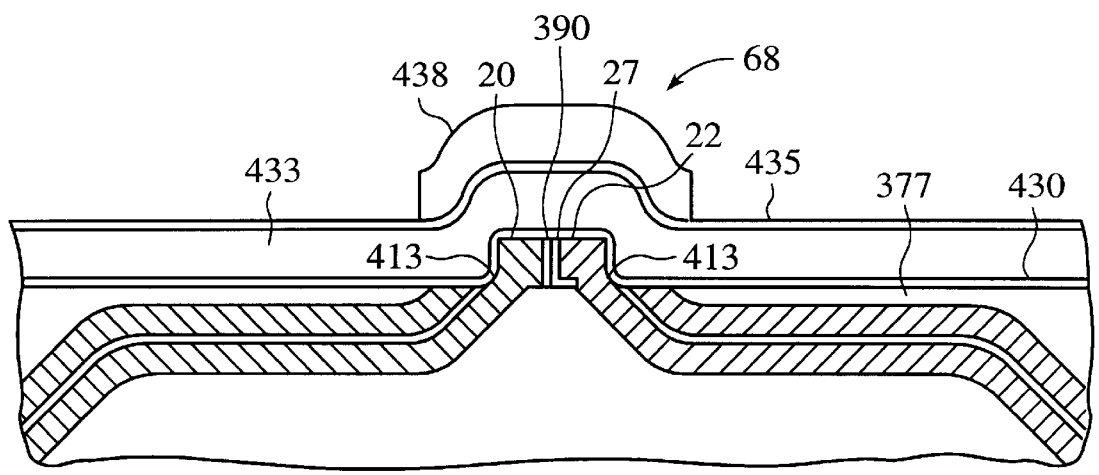
FIG. 22 is a cross-sectional view of the formation of a durable pad encasing the poletips of FIG. 9.

After electrical testing, the wafer carrying the transducer is ready for the formation of the support pads 68, 78 and 80, as shown in FIG. 22, which focuses on the MAP 68 for clarity. An adhesion layer 430 of Si is deposited to a thickness of about 500 Å atop the poletips 44 and alumina layer 377. A layer 433 of DLC is then sputtered onto the adhesion layer 430. An approximately 1500 Å thick layer 435 of NiFe is then deposited, which is then patterned by IBE with a lithographically defined photoresist mask 438 to leave, after IBE, a NiFe mask disposed over the DLC covered poletips 20 and 22 and over portions of the DLC layer at positions corresponding to the MIPS 78 and 80, not shown in this figure. The DLC layer 433 covered with the NiFe masks is then reactive ion etched with $O_2$ plasma to leave projections of DLC that form the MAP 68 and MIPS 78 and 80. The MAP 68 and MIPS 78 and 80 are then lapped to expose the poletips 20 and 22. The MAP 68 and MIPS 78 and 80 are next protected with a photoresist which extends laterally and longitudinally beyond the edges of each pad, and then an RIE etch using CF4/O2 removes the Si layer 430 not covered by the resist, leaving a flange of Si which helps to position undercutting of the alumina layer 377 further from the MAP and MIPS, resulting in a stronger MAP and MIPS that are thicker closer to the disk-facing surface. Alternatively, the Si layer 430 can be left over most of the surface to facilitate laser interferometer testing of chip flatness and tilt. The chip 62 is then laser scribed to provide lateral and longitudinal separations from other chips that have been simultaneously formed on the wafer substrate.

Figure 23:
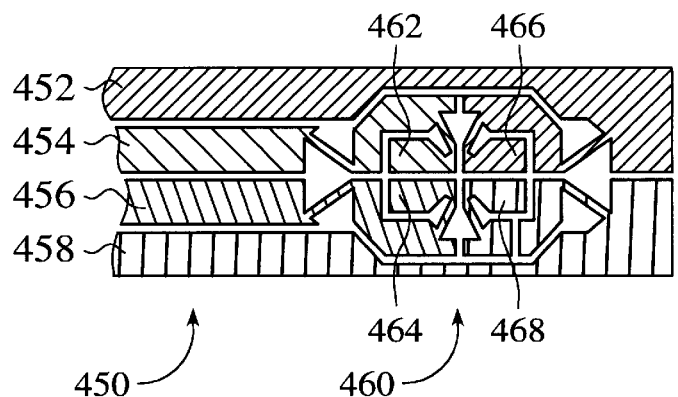
FIG. 23 is a cutaway bottom view of a flexure beam and gimbal to which the transducer of FIG. 12 is attached.

FIG. 23 illustrates an end of a flexure beam 450 that has been formed as a gimbal 460 employed to hold the chip 62 in contact with a rapidly spinning rigid disk. The beam 450 has four conductive leads 452, 454, 456 and 458 that extend along most of the length of the beam and provide electrical circuits for the coil 240 and the MR element 222, the leads being differentially shaded to facilitate their distinction. The leads 452, 454, 456 and 458 are connected with the terminals that protrude from the non-disk-facing side of the chip 62 by ultrasonic or thermo-compressive bonding, soldering or other means at areas 462, 464, 466 and 468. The convoluted paths between leads 452, 454, 456 and 458 and areas 462, 464, 466 and 468 allows the chip 62 to pitch and roll during sliding on the disk. The beam 450 is laminated, having a stiffening layer connected to the conductors 452, 454, 456 and 458 on an opposite side from the chip 62 by an adhesive damping layer.

Figure 24:
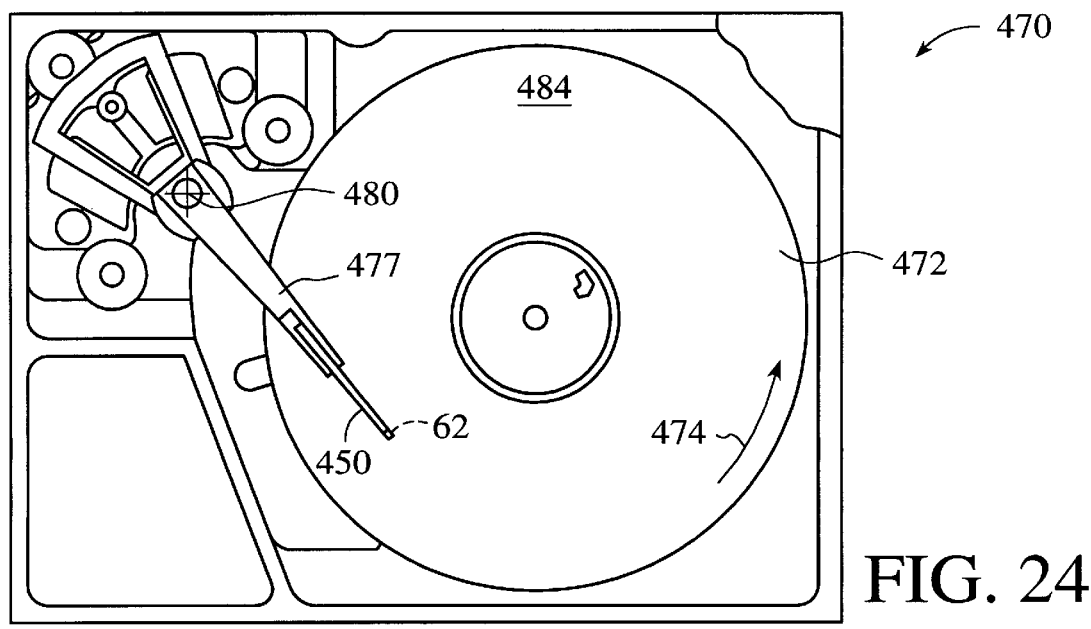
FIG. 24 is an opened up top view of a disk drive system employing the transducer of FIG. 12 and the beam of FIG. 23.

FIG. 24 shows an information storage system with the beam 450 holding the chip 62 in contact with a rigid disk 472 spinning rapidly (1,000 rpm to 8,000 rpm) in a direction of arrow 474. The beam 450 is mounted to an arm 477 of a rotary actuator which pivots about axis 480 to provide the chip 62 access to the magnetic recording surface 484. The recording media of the disk 475 has a large perpendicular anisotropy and low noise, facilitating perpendicular data storage with the ring head MR transducer 220.

Figure 25:
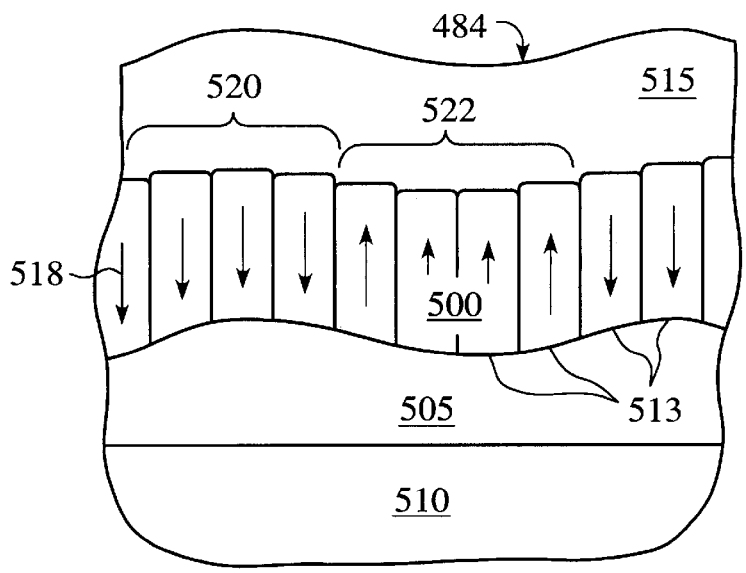
FIG. 25 is a highly magnified cross-sectional view of a magnetic recording surface having a high perpendicular anisotropy.

FIG. 25 focuses on a tremendously magnified cross-section of the magnetic recording surface 484 of the disk 475. A media layer 500 of the disk 472 may be composed of a number of alternating atomic films of cobalt (Co) and either paradium (Pd) or platinum (Pt) which are grown on a textured seed layer 505 of Tungsten (W), for example, on a substrate 510 of aluminum (Al) or glass, for instance. Whether formed by atomic layer deposition or as a cobalt based alloy, as shown in this figure, layer 500 grows atop the seed layer 505 in a number of columns 513 having a crystallographic C axis substantially perpendicular to the surface 484. The media layer 500 has a thickness generally in a range of about 100 Å to 1000 Å, with a preferable thickness of about 200 Å. On top of the media layer 500 a protective overcoat 515 of nitrogenated or hydrogenated carbon, for example, is formed to a thickness of about 100 Å.

The seed layer 505 imparts a texture to the disk surface 484 which helps to reduce friction during sliding. Alternatively, the media layer can be composed of barrium ferrite (BaFeO), in which case a protective overcoat is not necessary and the head to media spacing is reduced further. After writing with a closely spaced ring head, not shown in this figure, columns 513 are magnetized with fields shown by arrows 518. Groups of adjoining columns 513 that are magnetized in the same direction represent a bit of stored information, such that group 520 represents an up bit, and group 522 represents a down bit. For ultra high density recording, individual columns may represent single bits.

What is claimed is:

1. An information storage system comprising:
    a rigid disk having a major surface and an associated media layer, said disk spinning at greater than one thousand revolutions per minute, and
    a microscopic transducer having a disk-facing surface with a first portion including a plurality of projections disposed adjacent to said disk surface and a second portion removed from said disk surface, such that said first portion has a substantially smaller disk-facing area than said second portion, said transducer including a core of magnetically permeable material coupled as a loop having ends separated by a submicron amagnetic gap, a conductive write circuit inductively coupled to said core and a magnetoresistive read element disposed adjacent to said core,
    wherein said ends are disposed in one of said projections that has an at least partly sliding relationship with said major surface amid communication of magnetic signals to said media layer, and said magnetoresistive read element reads said magnetic signals from said media layer by primarily sensing components of said signals oriented substantially perpendicular to said major surface.

2. The system of claim 1 wherein an easy axis of magnetization of said media layer is substantially perpendicular to said major surface.

3. The system of claim 1 wherein said media layer is composed of a plurality of adjoining thin films.

4. The system of claim 3 wherein said films include a film composed primarily of cobalt and a film composed primarily of at least one of platinum and palladium.

5. The system of claim 3 wherein said media layer includes a plurality of columns that traverse said films.

6. The system of claim 1 wherein said magnetoresistive element is coupled to said core.

7. The system of claim 1 wherein said magnetoresistive element is separated from said core.

8. The system of claim 1 wherein said loop extends substantially further in a direction parallel to said disk-facing surface than in a direction perpendicular to said disk-facing surface.

9. The system of claim 1 wherein said ends are disposed closer to said disk than said read element.

10. An information storage system comprising:
    a rigid disk having a major surface and an associated magnetic media layer with an easy axis of magnetization oriented substantially perpendicular to said major surface, said disk spinning at greater than one thousand revolutions per minute, and
    a microscopic transducer having a disk-facing surface including a plurality of protuberances, said transducer including a magnetoresistive layer and a conductive coil that is inductively coupled to a loop of magnetically coupled material having a pair of poletips that are encased by one of said protuberances adjacent to said disk,
    wherein said one protuberance is disposed in dynamic contact with said major surface, such that a magnetic signal transmitted from said media to said transducer has a component directed perpendicular to said major surface and a component directed parallel to said major surface, and said magnetoresistive layer predominantly senses said component directed perpendicular to said major surface.

11. The system of claim 10 wherein said loop extends substantially further in a direction parallel to said disk-facing surface than in a direction perpendicular to said disk-facing surface.

12. The system of claim 10 wherein said media includes a plurality of adjoining layers with a plurality of columns traversing said layers.

13. The system of claim 10 wherein said media includes a plurality of adjoining layers each composed primarily of at least one of cobalt, platinum and palladium.

14. The system of claim 10 wherein said magnetoresistive layer is spaced from said major surface.

15. The system of claim 10 wherein said magnetoresistive layer is coupled to said loop.

16. The system of claim 10 wherein said magnetoresistive layer is spaced from said loop.

17. An information storage system comprising:
    a rigid disk having a major surface and an associated magnetic media layer, said disk spinning at greater than one thousand revolutions per minute, and
    a plank-shaped body having a disk-facing surface, said disk-facing surface including a plurality of protuberances and said body including a magnetoresistive read circuit and an inductive write circuit, such that said write circuit is coupled to a pair of magnetic layers each having a poletip that is encased in one of said protuberances adjacent to said disk, said poletips being separated by a submicron amagnetic gap, wherein said protuberance contacts said major surface amid communication between said poletips and said media, wherein a magnetic signal from said media layer crosses said major surface with a component parallel to said major surface and a component perpendicular to said major surface, and said magnetoresistive read circuit senses said perpendicular component more than said parallel component.

18. The system of claim 17 wherein said media layer has an easy axis of magnetization oriented substantially perpendicular to said major surface.

19. The system of claim 17 wherein said media layer includes a number of crystalline columns having axes oriented substantially perpendicular to said major surface and crossing a plurality of magnetic films disposed substantially parallel to said disk surface.

20. The system of claim 17 wherein said media layer is composed of alternating films of a magnetic material and a noble metal and is segregated into crystalline structure which traverse said films, wherein said magnetic material includes cobalt and said noble includes at least one of platinum and palladium.

21. The system of claim 17 wherein said magnetoresistive read circuit is removed from said major surface.

* * * * *